United States Patent
Hajj et al.

(10) Patent No.: US 10,180,331 B2
(45) Date of Patent: Jan. 15, 2019

(54) TRANSIT NAVIGATION

(71) Applicant: Apple Inc., Cupertino, CA (US)

(72) Inventors: Usama M. Hajj, San Francisco, CA (US); Marcel van Os, Santa Cruz, CA (US); Brian Andrich, San Francisco, CA (US); Ian Leighton, Kensington, CA (US); Justin O'Beirne, San Francisco, CA (US); David Hodge, Mountain View, CA (US); Eleanor Cady Wachsman, San Francisco, CA (US); Nathaniel V. Kelso, San Francisco, CA (US); Aaron A. Reiner, Mountain View, CA (US); Christine B. McGavran, Pacifica, CA (US); Wesley Yue, Sunnyvale, CA (US); Eric L. Grundstrom, Oakland, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 14/869,570

(22) Filed: Sep. 29, 2015

(65) Prior Publication Data

US 2016/0356613 A1    Dec. 8, 2016

Related U.S. Application Data

(60) Provisional application No. 62/172,206, filed on Jun. 7, 2015, provisional application No. 62/172,214, filed (Continued)

(51) Int. Cl.
*G01C 21/00*     (2006.01)
*G01C 21/34*     (2006.01)
(Continued)

(52) U.S. Cl.
CPC ......... *G01C 21/3423* (2013.01); *G01C 21/20* (2013.01); *G01C 21/3484* (2013.01); (Continued)

(58) Field of Classification Search
None
See application file for complete search history.

(56) References Cited

U.S. PATENT DOCUMENTS 5,177,684 A     1/1993   Harker et al.
5,412,573 A     5/1995   Barnea et al.
(Continued)

FOREIGN PATENT DOCUMENTS

| EP | 2733651 A1 | 5/2014 |
|---|---|---|
| TW | 201038923 A | 11/2010 |
| WO | 2015/024807 A1 | 2/2015 |

OTHER PUBLICATIONS

Author Unknown, "Transit-BEST Bus & Rail App! How to Navigate Major Cities" MrApp4That, Sep. 24, 2014, available at https://www.youtube.com/watch?v=IEjo_PWWOAQ YouTube, USA.
(Continued)

*Primary Examiner* — Jonathan M Dager
(74) *Attorney, Agent, or Firm* — Invoke

(57) ABSTRACT

Some embodiments provide a map application that identifies a transit route that includes one or more transit legs between a starting location and a destination location. In response to a request to start navigating the identified transit route, the map application of some embodiments provides a first display area for displaying a set of navigation instructions, each of which describes a transit maneuver that is associated with a transit leg of the transit route. The map application also provides a second display area for displaying a map region presentation associated with the navigation instruction that is displayed in the first display area.

23 Claims, 16 Drawing Sheets

Related U.S. Application Data on Jun. 7, 2015, provisional application No. 62/172,209, filed on Jun. 7, 2015, provisional application No. 62/172,216, filed on Jun. 7, 2015.

(51) Int. Cl.
  *G08G 1/123*  (2006.01)
  *G01C 21/36*  (2006.01)
  *G06F 3/0484*  (2013.01)
  *G06F 3/0485*  (2013.01)
  *G06F 3/0488*  (2013.01)
  *G08G 1/01*  (2006.01)
  *G01C 21/20*  (2006.01)

(52) U.S. Cl.
  CPC ......... *G01C 21/36* (2013.01); *G01C 21/3667* (2013.01); *G06F 3/0485* (2013.01); *G06F 3/0488* (2013.01); *G06F 3/04842* (2013.01); *G08G 1/0125* (2013.01); *G08G 1/123* (2013.01)

(56) References Cited

U.S. PATENT DOCUMENTS

| | | | |
|---|---|---|---|
| 5,977,990 A | 11/1999 | Kowalski | |
| 6,249,741 B1 | 6/2001 | Iwasaki et al. | |
| 7,030,781 B2 | 4/2006 | Jones | |
| 7,221,287 B2* | 5/2007 | Gueziec | H04W 4/029 340/905 |
| 7,469,827 B2 | 12/2008 | Katragadda et al. | |
| 7,693,657 B2* | 4/2010 | Endo | G01C 21/3691 340/995.13 |
| 7,746,343 B1 | 6/2010 | Charaniya et al. | |
| 7,818,116 B1* | 10/2010 | Nesbitt | G01C 21/367 340/955 |
| 7,925,427 B2 | 4/2011 | Zehler | |
| 7,933,897 B2 | 4/2011 | Jones et al. | |
| 7,957,871 B1 | 6/2011 | Echeruo | |
| 8,031,206 B2* | 10/2011 | Shoemaker | G06T 3/40 345/619 |
| 8,301,112 B2 | 10/2012 | Morrison | |
| 8,315,801 B2 | 11/2012 | Takagi | |
| 8,489,328 B2* | 7/2013 | Lee | G09B 29/10 701/410 |
| 8,532,851 B2 | 9/2013 | Kondo et al. | |
| 8,588,818 B2 | 11/2013 | Huang et al. | |
| 8,681,176 B1 | 3/2014 | Maurer et al. | |
| 8,825,376 B1* | 9/2014 | Szybalski | G01C 21/3415 701/412 |
| 8,972,185 B1 | 3/2015 | Viger et al. | |
| 8,972,190 B1 | 3/2015 | Pech et al. | |
| 8,996,304 B2* | 3/2015 | Needham | G01C 21/343 701/302 |
| 8,996,312 B1* | 3/2015 | Freund | G01C 21/3461 455/457 |
| 9,043,150 B2 | 5/2015 | Forstall et al. | |
| 9,057,612 B1 | 6/2015 | Savvopoulos | |
| 9,082,134 B2 | 7/2015 | Gishen | |
| 9,171,464 B2* | 10/2015 | Khetan | G08G 1/0962 |
| 9,194,717 B2* | 11/2015 | Jouaux | G06Q 10/047 |
| 9,212,924 B1 | 12/2015 | Salowitz | |
| 9,285,231 B2* | 3/2016 | Jouaux | G01C 21/34 |
| 9,317,813 B2 | 4/2016 | McGavran et al. | |
| 9,396,508 B2 | 7/2016 | Otero et al. | |
| 9,418,672 B2* | 8/2016 | Pylappan | H04L 5/00 |
| 9,482,296 B2* | 11/2016 | Lemay | G01C 21/3673 |
| 9,500,494 B2* | 11/2016 | van Os | G01C 21/3632 |
| 9,618,344 B2* | 4/2017 | Harrison | G01S 19/48 |
| 9,940,679 B2 | 4/2018 | Hampson et al. | |
| 2002/0069017 A1 | 6/2002 | Schmier et al. | |
| 2003/0019266 A1 | 1/2003 | Kanno | |
| 2003/0036848 A1* | 2/2003 | Sheha | G01C 21/3679 701/468 |
| 2003/0109266 A1 | 6/2003 | Rafiah et al. | |
| 2004/0158395 A1 | 8/2004 | Yamada et al. | |
| 2004/0181337 A1 | 9/2004 | Kawasaki et al. | |
| 2004/0233070 A1* | 11/2004 | Finnern | G08G 1/096816 340/995.13 |
| 2005/0192025 A1 | 9/2005 | Kaplan | |
| 2005/0222760 A1* | 10/2005 | Cabral | G01C 21/3492 701/423 |
| 2006/0149461 A1 | 7/2006 | Rowley et al. | |
| 2006/0293847 A1 | 12/2006 | Marriott et al. | |
| 2007/0118520 A1 | 5/2007 | Bliss et al. | |
| 2007/0138347 A1 | 6/2007 | Ehlers | |
| 2007/0150179 A1* | 6/2007 | Pinkus | G01C 21/362 701/436 |
| 2007/0194940 A1 | 8/2007 | Valluru | |
| 2007/0208492 A1* | 9/2007 | Downs | G08G 1/0104 701/117 |
| 2007/0208498 A1 | 9/2007 | Barker et al. | |
| 2007/0208502 A1 | 9/2007 | Sakamoto et al. | |
| 2007/0210937 A1 | 9/2007 | Smith et al. | |
| 2008/0068221 A1 | 3/2008 | Park | |
| 2008/0071465 A1* | 3/2008 | Chapman | G01C 21/3691 701/117 |
| 2008/0147313 A1* | 6/2008 | Nesbitt | G01C 21/367 701/426 |
| 2008/0238941 A1 | 10/2008 | Kinnan et al. | |
| 2008/0291925 A1 | 11/2008 | Fisher et al. | |
| 2009/0018766 A1* | 1/2009 | Chen | G01C 21/3611 701/533 |
| 2009/0063041 A1* | 3/2009 | Hirose | G01C 21/3632 701/533 |
| 2009/0063048 A1* | 3/2009 | Tsuji | G01C 21/30 701/455 |
| 2009/0112462 A1* | 4/2009 | Lo | G01C 21/34 701/533 |
| 2009/0119001 A1 | 5/2009 | Moussaeiff et al. | |
| 2009/0143977 A1 | 6/2009 | Beletski et al. | |
| 2009/0171561 A1* | 7/2009 | Geelen | G01C 21/3635 701/437 |
| 2009/0171575 A1* | 7/2009 | Kim | G01C 21/3632 701/431 |
| 2009/0216732 A1* | 8/2009 | Feng | G01C 21/3611 |
| 2010/0017118 A1 | 1/2010 | Dougherty | |
| 2010/0070173 A1* | 3/2010 | Sakamoto | G01C 21/20 701/533 |
| 2010/0115030 A1 | 5/2010 | Hong et al. | |
| 2010/0123737 A1 | 5/2010 | Williamson et al. | |
| 2010/0125410 A1* | 5/2010 | Hicks | B61L 25/025 701/533 |
| 2010/0153004 A1 | 6/2010 | Natsume | |
| 2010/0185386 A1* | 7/2010 | Hess | G01C 21/3655 701/533 |
| 2010/0197325 A1 | 8/2010 | Dredge | |
| 2010/0201707 A1 | 8/2010 | Rasmussen et al. | |
| 2010/0211303 A1 | 8/2010 | Stanton | |
| 2010/0253549 A1 | 10/2010 | Kim et al. | |
| 2010/0280853 A1 | 11/2010 | Petralia et al. | |
| 2010/0318285 A1 | 12/2010 | Kim et al. | |
| 2011/0010084 A1 | 1/2011 | Carlsson et al. | |
| 2011/0106423 A1* | 5/2011 | Morley | G01C 21/3423 701/533 |
| 2011/0112759 A1 | 5/2011 | Bast et al. | |
| 2011/0130950 A1 | 6/2011 | Wexler et al. | |
| 2011/0130961 A1* | 6/2011 | Kuenzner | G01C 21/3664 701/533 |
| 2011/0177845 A1 | 7/2011 | Fasold | |
| 2011/0178697 A1* | 7/2011 | Mincey | G01C 21/3644 701/532 |
| 2011/0181620 A1 | 7/2011 | Hung | |
| 2011/0191014 A1 | 8/2011 | Feng et al. | |
| 2011/0246054 A1 | 10/2011 | Toma | |
| 2011/0301843 A1 | 12/2011 | Gale et al. | |
| 2012/0004840 A1 | 1/2012 | Lee et al. | |
| 2012/0053830 A1 | 3/2012 | Bach | |
| 2012/0303263 A1* | 11/2012 | Alam | G01C 21/32 701/410 |

(56) References Cited

U.S. PATENT DOCUMENTS

| | | | |
|---|---|---|---|
| 2012/0303264 A1* | 11/2012 | Su | G01C 21/3415 701/416 |
| 2013/0035853 A1* | 2/2013 | Stout | G06T 17/05 701/438 |
| 2013/0041941 A1 | 2/2013 | Steinfeld | |
| 2013/0046456 A1 | 2/2013 | Schwebel | |
| 2013/0103313 A1* | 4/2013 | Moore | G01C 21/20 701/533 |
| 2013/0159908 A1 | 6/2013 | Knospe | |
| 2013/0191020 A1* | 7/2013 | Emani | G08G 1/096816 701/468 |
| 2013/0231859 A1* | 9/2013 | Kim | G01C 21/00 701/468 |
| 2013/0234868 A1* | 9/2013 | Koth | G08G 1/127 340/994 |
| 2013/0261956 A1 | 10/2013 | Marks | |
| 2013/0262222 A1 | 10/2013 | Gibson et al. | |
| 2013/0322665 A1* | 12/2013 | Bennett | G08G 1/096855 381/300 |
| 2013/0322702 A1 | 12/2013 | Piemonte et al. | |
| 2013/0325320 A1* | 12/2013 | Dimitriadis | G01C 21/3415 701/414 |
| 2013/0325340 A1 | 12/2013 | Forstall et al. | |
| 2013/0325342 A1* | 12/2013 | Pylappan | G10L 21/00 701/533 |
| 2013/0326425 A1* | 12/2013 | Forstall | G01C 21/3638 715/851 |
| 2013/0328924 A1* | 12/2013 | Arikan | G06T 11/20 345/629 |
| 2013/0344802 A1 | 12/2013 | Armour et al. | |
| 2013/0345959 A1* | 12/2013 | van Os | G01C 21/3632 701/408 |
| 2014/0012498 A1 | 1/2014 | Gustafson et al. | |
| 2014/0032114 A1 | 1/2014 | Titus et al. | |
| 2014/0050122 A1 | 2/2014 | Pro et al. | |
| 2014/0095066 A1* | 4/2014 | Bouillet | G08G 1/0104 701/465 |
| 2014/0129135 A1 | 5/2014 | Holden et al. | |
| 2014/0129143 A1* | 5/2014 | Dave | G01C 21/3407 701/537 |
| 2014/0142834 A1 | 5/2014 | Maitra et al. | |
| 2014/0278070 A1 | 9/2014 | McGavran et al. | |
| 2014/0278071 A1 | 9/2014 | San Filippo et al. | |
| 2014/0278616 A1 | 9/2014 | Stone et al. | |
| 2014/0340421 A1 | 11/2014 | Otero et al. | |
| 2014/0343852 A1 | 11/2014 | Pech et al. | |
| 2014/0358409 A1 | 12/2014 | Khoe et al. | |
| 2014/0358410 A1* | 12/2014 | Khoe | G08G 1/13 701/117 |
| 2014/0358411 A1 | 12/2014 | Khoe et al. | |
| 2014/0359510 A1 | 12/2014 | Graf et al. | |
| 2014/0364150 A1 | 12/2014 | Marti et al. | |
| 2014/0365113 A1* | 12/2014 | McGavran | G01C 21/00 701/425 |
| 2014/0365122 A1* | 12/2014 | McGavran | G01C 21/3632 701/533 |
| 2014/0372904 A1 | 12/2014 | Liu et al. | |
| 2015/0046083 A1 | 2/2015 | Maitra et al. | |
| 2015/0051823 A1* | 2/2015 | Joglekar | G08G 1/0145 701/118 |
| 2015/0106012 A1* | 4/2015 | Kandangath | G01C 21/3629 701/428 |
| 2015/0160024 A1 | 6/2015 | Fowe | |
| 2015/0168148 A1 | 6/2015 | Pech et al. | |
| 2015/0170229 A1 | 6/2015 | Flier et al. | |
| 2015/0177013 A1* | 6/2015 | Siliski | G01C 21/3423 701/433 |
| 2015/0186414 A1 | 7/2015 | Campbell | |
| 2015/0187127 A1 | 7/2015 | Jones et al. | |
| 2015/0234529 A1 | 8/2015 | Kim et al. | |
| 2015/0253148 A1* | 9/2015 | Moore | G01C 21/367 701/532 |
| 2015/0262399 A1 | 9/2015 | Popescu | |
| 2015/0308844 A1 | 10/2015 | Shimazaki et al. | |
| 2015/0323331 A1 | 11/2015 | Lord et al. | |
| 2015/0332589 A1 | 11/2015 | Eichhorst | |
| 2015/0345951 A1 | 12/2015 | Dutta et al. | |
| 2015/0345973 A1 | 12/2015 | Flier et al. | |
| 2015/0345976 A1* | 12/2015 | Moore | G01C 21/3632 701/519 |
| 2015/0369621 A1 | 12/2015 | Abhyanker | |
| 2016/0003637 A1* | 1/2016 | Andersen | G01C 21/3617 701/519 |
| 2016/0033289 A1 | 2/2016 | Tuukkanen et al. | |
| 2016/0102992 A1* | 4/2016 | Otero Diaz | G01C 21/3667 701/532 |
| 2016/0116296 A1 | 4/2016 | Nguyen et al. | |
| 2016/0202079 A1 | 7/2016 | Konig et al. | |
| 2016/0216126 A1 | 7/2016 | Park et al. | |
| 2016/0216130 A1* | 7/2016 | Abramson | G01C 21/3626 |
| 2016/0231129 A1 | 8/2016 | Erez et al. | |
| 2016/0282129 A1* | 9/2016 | Wang | H04W 4/02 |
| 2016/0290818 A1 | 10/2016 | Kim et al. | |
| 2016/0291820 A1 | 10/2016 | Mak et al. | |
| 2016/0298977 A1 | 10/2016 | Newlin et al. | |
| 2016/0341564 A1* | 11/2016 | Cheng | G01C 21/3641 |
| 2016/0356603 A1 | 12/2016 | Hajj et al. | |
| 2016/0356610 A1 | 12/2016 | O'Beirne et al. | |
| 2016/0356613 A1 | 12/2016 | Hajj et al. | |
| 2016/0356614 A1 | 12/2016 | O'Beirne et al. | |
| 2016/0356617 A1 | 12/2016 | Verosub et al. | |
| 2016/0356624 A1 | 12/2016 | O'Beirne et al. | |
| 2016/0356625 A1* | 12/2016 | O'Beirne | G01C 21/3676 |
| 2016/0358469 A1 | 12/2016 | Pirwani et al. | |
| 2016/0358470 A1 | 12/2016 | Pirwani | |
| 2016/0358471 A1 | 12/2016 | Hajj et al. | |
| 2017/0010118 A1* | 1/2017 | Hajj | G01C 21/3492 |
| 2017/0031926 A1 | 2/2017 | Katircioglu et al. | |
| 2017/0074669 A1 | 3/2017 | Newlin et al. | |
| 2017/0343376 A9* | 11/2017 | O'Beirne | G01C 21/3673 |
| 2018/0066955 A1* | 3/2018 | O'Beirne | G01C 21/3676 |
| 2018/0212684 A1 | 7/2018 | Aoyama et al. | |

OTHER PUBLICATIONS

Gontmahker, Sasha, "Know When Your Bus is Late with Live Transit Updates in Google Maps", Official Google Blog, Published Jun. 8, 2011, 11 pages, https://googleblog.blogspot.com/2011/06/know-when-your-bus-is-late-with-live.html.

Tirachini A. et al.: "Restating modal investment priority with an improved model for public transport analysis", Transportation Research Part E: Logistics and Transportation Review, Pergamon, Amsterdam, NL, vol. 46, No. 6, Nov. 1, 2010 (Nov. 1, 2010), pp. 1148-1168, XP027121542, ISSN: 1365-5545.

Nourish, Google Maps Introduces New, Smarter Transit Routing, May 17, 2013, Seattle Transit Blog, https://www.seattletransitblog.com/2013/05/17/google-maps-introduces-guidebook-routing/.

Non-Published Commonly Owned International Patent Application PCT/US2016/035903, filed Jun. 3, 2016, 83 pages, Apple, Inc.

Non-Published Commonly Owned International Patent Application PCT/US16/35906, filed Jun. 3, 2016, 177 pages, Apple, Inc.

Non-Published Commonly Owned International Patent Application PCT/US16/34472, filed May 26, 2016, 93 pages, Apple, Inc.

Metro "Schedules Bus & Rail" <http://www.ridemetro.org/pages/schedulesbusrail.aspx>.

Metro METRORail Red Line Map & Schedules <http://www.ridemetro.org/pages/RedLine.aspx>.

Maryland Transit Administration, "Light Rail Schedule" <http://mta.maryland.gov/LRTracker/Home/TrainSchedule>.

Bruce Nourish: "Google Maps Introduces New, Smart Transit Routing", Seattle Transit Blog, May 17, 2013 (May 17, 2013), XP002761347, Retrieved from the Internet: URL: https://seattletransitblog.com/2013/05/17/google-maps-introduces-guidebook-routing/.

Bast, Hannah, et al., "Frequency-Based Search for Public Transit", Proceedings of the 22nd ACM Sigspatial International Conference on Advances in Geographic Information Systems, Sigspatial '14, Nov. 4-7, 2014, 19 pages, ACM, Dallas/Fort Worth, USA.

(56) References Cited

OTHER PUBLICATIONS

Vuchic, "Role of Organization of Transfers in Transit Networks", 1992, Proceedings of the 6th World Conference on Transport Research.

\* cited by examiner

TRANSIT NAVIGATION

CLAIM OF BENEFIT TO PRIOR APPLICATIONS

This application claims the benefit of U.S. Provisional Patent Application 62/172,206, filed Jun. 7, 2015; U.S. Provisional Patent Application 62/172,209, filed Jun. 7, 2015; U.S. Provisional Patent Application 62/172,214, filed Jun. 7, 2015; and U.S. Provisional Patent Application 62/172,216, filed Jun. 7, 2015. U.S. Provisional Patent Applications 62/172,206, 62/172,209, 62/172,214, and 62/172,216 are incorporated herein by reference.

BACKGROUND

With proliferation of mobile devices such as smartphones, users are enjoying numerous applications of numerous kinds that can be run on their devices. One popular type of such applications is mapping and navigation applications that allow users to browse maps and receive route directions. Despite their popularity, these mapping and navigation applications have yet to provide a comprehensive and efficient transit routing and navigation system.

BRIEF SUMMARY

Some embodiments of the invention provide a map application that provides a comprehensive and efficient transit navigation modality for planning a transit trip by browsing and selecting a transit route and navigating the selected transit route. The map application of some embodiments operates in a map-browsing mode to allow a user to browse a map of a locality and to perform searches for map locations based on addresses, names (e.g., people, businesses, etc.) or other search parameters. The map application of some such embodiments also has a navigation mode that includes a driving navigation mode to provide driving navigation directions, a walking navigation mode to provide walking navigation directions, and a transit navigation mode to provide transit navigation directions.

The map application of some embodiments, upon receiving a request to display a route in transit mode, identifies one or more transit routes between two locations and displays the best possible transit route among the identified routes to the user. Specifically, to identify the transit routes, the application of some embodiments examines different transit legs that one or more transit vehicles of one or more transit systems travel from locations near a specified starting location (e.g., the current location of the device) to locations near a specified destination. In some embodiments, each transit leg of a transit route includes a section of the transit route that is traveled by a transit vehicle of a transit line. A transit leg may also include a walking distance that is more than a threshold distance.

In examining the transit legs, the application of some embodiments takes into account a set of transit preferences that are customized (i.e., set or adjusted) by the user. For instance, in some embodiments, a user may adjust the date and time of the departure (from, e.g., the current location of the user) to a particular date and time instead of the current time. Conversely, the user may prefer a particular type of transit vehicle (i.e., a transit vehicle of a particular transit system) over the other types. For example, the user might rather ride a subway train over a bus for a particular transit leg of a transit route, or use only ground transportation for an entire transit route (e.g., a transit route without any ferry trips).

Based on the examination of the transit legs, the map application identifies one or more transit routes that use one or more transit vehicles of one or more transit systems in some embodiments. The identified transit routes may also include one or more pedestrian routes that are between the different transit legs, between the starting location and the first transit leg, and between the last transit leg and the destination location. After identifying the transit routes, the map application selects one of the identified transit routes based on a set of criteria (e.g., fastest route, shortest route, route with least amount of walking, route requiring least amount of transit vehicle changes, route requiring least amount of transit system changes, etc.). In some embodiments, the set of selection criteria relies on two or more selection parameters. Also, in some embodiments, the set of selection criteria is different in different transit markets and/or in different time periods in the same transit market.

The map application of some embodiments displays the best identified route in its entirety over a portion of a map presentation of a geographical area. The application of some such embodiments displays the identified route in multiple sections (transit legs) each of which is traveled by a transit vehicle of a particular transit line. The map application uses different graphical representations for different portions of a displayed transit route that are traveled by different types of transit vehicles or require walking. In some embodiments, the different types of transit vehicles that are presented by different graphical representations include buses, subway trains, rail trains (e.g., light rail trains and heavy rail trains), and ferries. Each of these four categories may include multiple different subcategories in some embodiments and additional transit categories (e.g., tramways, trolleys, etc.) may be present in some embodiments. When the selected transit route includes multiple transit vehicles of the same type (same transit system), each transit vehicle of the same transit system is distinguished from the other transit vehicles by a different line of the transit vehicle.

The map application of some embodiments provides a route summary representation for the different identified transit routes in different display areas of the application UI. For instance the application provides a route summary presentation in the route planning display area where the best selected transit route is displayed to the user. The application also provides a list of route summary presentations for all the identified transit routes upon a request for displaying such (e.g., upon selection of a UI control for requesting additional routes). Each route summary presentation may include a different representation for each transit vehicle for each leg of the transit route, along with the line of the transit vehicle and a walking person representation for a walking (pedestrian) leg of the transit route when the walking distance is more than a threshold distance.

In some embodiments, when a user selects a presentation of a route summary (e.g., by placing, pointing, or tapping a finger on the presentation on a touch sensitive display screen of the device, clicking on the presentation, etc.), the map application provides a list view (e.g., a navigation list view) of the transit route that provides a list of detailed instructions on how to navigate the transit route. In some embodiments, each leg of the transit route that is traveled by a transit vehicle corresponds to a pair of navigation instructions in the list view.

More specifically, in some embodiments, for each leg of the transit route that is associated with a different transit vehicle, a first instruction sets forth the name of the transit station (e.g., bus stop, subway station, ferry terminal, etc.) to board the transit vehicle and the second instruction indicates the name of the transit station to exit the transit vehicle. Some other embodiments display all the instructions related to a transit leg in one navigation instruction. Some embodiments also provide a navigation instruction for each walking portion (between the stations, from the departure point to the first station, and from the last station to the destination) of the transit route.

In addition to displaying a navigation list view upon selection of a route summary presentation, when a user starts navigation in the transit navigation mode (e.g., by selecting a start navigation control), the map application of some embodiments provides a transit navigation presentation that displays navigation instructions for the different transit maneuvers of a transit route in a sequence of navigation banners. A transit leg refers to a portion of a transit route that starts or ends with a transit maneuver that requires a transit vehicle change or a walking portion of the transit route (i.e., between two transit vehicle portions, or at the start or end of a transit route).

The different transit maneuvers in some embodiments include boarding a transit vehicle of the transit route, exiting a transit vehicle, walking to a transit station, and walking to the destination of the transit route. Some embodiments combine the navigation instructions for two or more transit maneuvers that relate to the same transit leg. For example, some embodiments display a single navigation instruction for walking to a transit station and boarding a transit vehicle at the station. Some other embodiments, on the other hand, provide a separate navigation instruction for entering each transit station of a transit route.

In some embodiments, the map application allows a user to select and scroll through a set of navigation banners representing the different transit maneuvers of a selected transit route when the user starts the navigation presentation mode. As the user scrolls through each navigation banner (e.g., by swiping the navigation banner to the left or right), the portion of the route (e.g., a transit leg) associated with the currently in-focus navigation banner is presented to the user in a second display area. A representation of the currently displayed transit maneuver in the second display area of some embodiments is highlighted on the transit route (e.g., through color highlighting).

In some embodiments, the representation of the transit leg in the second display area (i.e., the representation of the transit leg drawn over a portion of the map that corresponds to the transit maneuver) is augmented to display more details about the transit maneuver on the map. Additionally, some embodiments prioritize road labels based on proximity to transit maneuvers and the current displayed maneuver. That is, in some embodiments, the road labels (e.g., street signs) that correspond to the transit maneuver are displayed in the second display area over a portion of the map that is related to the displayed navigation banner in the first display area.

Some embodiments provide navigation instructions (e.g., in a navigation banner) intelligently based on the position of the device. These embodiments detect the current position of the user and provide a text (and/or pictorial) instruction that is related to the current position of the user. For example, when the user is detected to be outside a transit station, some embodiments provide a text (and/or pictorial) instruction that instructs the user to "enter" the transit station. On the other hand, when the position of the user is detected to be inside the transit station, some such embodiments provide a text (and/or pictorial) instruction (e.g., in a navigation banner for the same transit leg of the route) that instructs the user to "board" the transit vehicle. Additionally, when the device's location is within one or more of the maneuver map views, the map application of some embodiments displays the device's location on the map view(s) so that the user can orient him/herself with the required transit navigation maneuvers.

The map application of some embodiment iteratively monitors the current position of the device along the transit route. In some such embodiments, when the application determines that the currently displayed navigation banner is for a transit leg that is not associated with the current location of the device, the application automatically, and without user intervention, scrolls back (or forward) the navigation banner display area and the map view display area to display the navigation banner and map view for a transit leg that is associated with the current position of the device. That is, the map application automatically changes the currently displayed banner and map view to a navigation banner and map view that are associated with a portion of the transit route that covers the current location of the device (e.g., by scrolling back or forward the intervening navigation banners and map views). The map application of these embodiments displays the new navigation banner and its corresponding maneuver map view without receiving any user interaction with the device (e.g., a touch gesture, a swipe gesture, etc.).

Before automatically scrolling the navigation banners to display the navigation banner that is associated with the current transit leg, the map application of some embodiments first determines that the application has accurately detected the current location of the device (e.g., by ascertaining that the device has enough reception to accurately determine its current position). Therefore, in some embodiments, in order for the map application to change the current transit leg's navigation banner and its corresponding map view, the application determines that (1) an accurate location of the device is identified, (2) the currently displayed banner is not associated with the current location of the device, and (3) a certain time period has passed since the currently displayed banner has been last shown to the user.

In some embodiments, the map application determines whether any of the transit legs of a selected transit route is replaceable by a second different route that is traveled by one or more other transit vehicles. In some embodiments a transit leg is replaceable by a second route when the second route runs parallel with the identified transit leg (i.e., from the same starting station to the same ending station). In some other embodiments a transit leg is replaceable by a second route when the second route and the transit leg have at least two common transit stations or two transit stations that are within a short distance of each other (e.g., within a threshold distance of each other).

In some embodiments, the one or more other transit vehicles of the second route are of the same type as the transit vehicle that travels the transit leg (i.e. the transit vehicles are from the same transit system), while in other embodiments the transit vehicles are of different types (e.g., the transit leg is traveled by a bus, while the second route is traveled by a subway train). When the map application of some embodiments determines that a transit leg of a transit route can be replaced with other routes, the map application displays the other routes to the user along with the same navigation instruction that is associated with the transit leg. That is, the navigation application displays the navigation instruction for the transit leg (e.g., in the list view, in the navigation banner, etc.) and provides the other identified routes as selectable UI items for the user to be able to modify the selected transit route.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
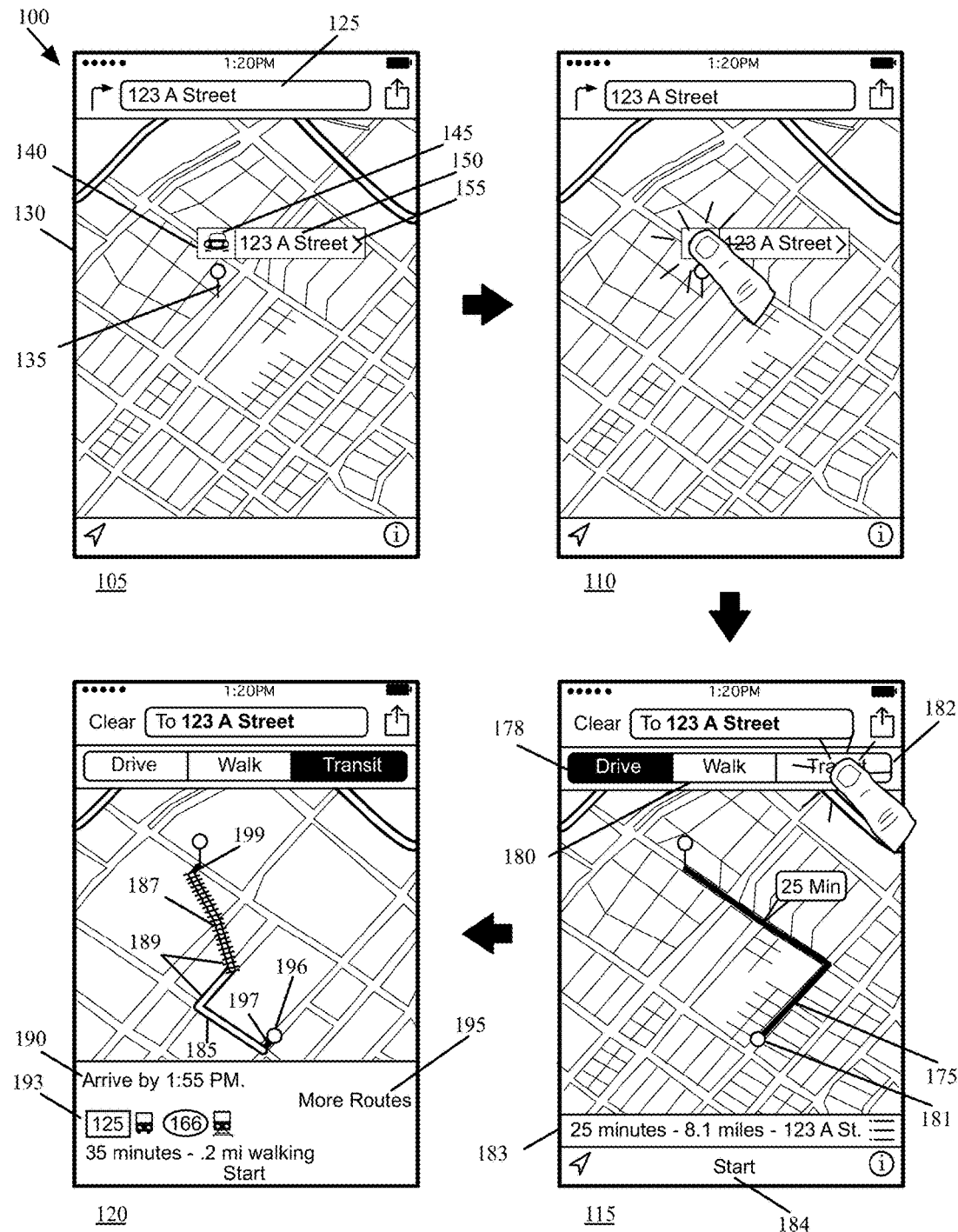
FIG. 1 illustrates how the transit navigation mode of a map application can be selected.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a map application that provides a comprehensive and efficient transit navigation modality for planning a transit trip by browsing and selecting a transit route and navigating the selected transit route. The map application of some embodiments operates in a map-browsing mode to allow a user to browse a map of a locality and to perform searches for map locations based on addresses, names (e.g., people, businesses, etc.) or other search parameters. The map application of some such embodiments also has a navigation mode that includes a driving navigation mode to provide driving navigation directions, a walking navigation mode to provide walking navigation directions, and a transit navigation mode to provide transit navigation directions.

The map application of some embodiments, upon receiving a request to display a route in transit mode, identifies one or more transit routes between two locations and displays the best possible transit route among the identified routes to the user. Specifically, to identify the transit routes, the application of some embodiments examines different transit legs that one or more transit vehicles of one or more transit systems travel from locations near a specified starting location (e.g., the current location of the device) to locations near a specified destination. In some embodiments, each transit leg of a transit route includes a section of the transit route that is traveled by a transit vehicle of a transit line. A transit leg may also include a walking distance that is more than a threshold distance.

In examining the transit legs, the application of some embodiments takes into account a set of transit preferences that are customized (i.e., set or adjusted) by the user. For instance, in some embodiments, a user may adjust the date and time of the departure (from, e.g., the current location of the user) to a particular date and time instead of the current time. Conversely, the user may prefer a particular type of transit vehicle (i.e., a transit vehicle of a particular transit system) over the other types. For example, the user might rather ride a subway train over a bus for a particular transit leg of a transit route, or use only ground transportation for an entire transit route (e.g., a transit route without any ferry trips).

Based on the examination of the transit legs, the map application identifies one or more transit routes that use one or more transit vehicles of one or more transit systems in some embodiments. The identified routes may also include one or more pedestrian routes that are between the different transit trips, between the starting location and the first transit trip, and between the last transit trip and the destination location. After identifying the transit routes, the map application selects one of the identified transit routes based on a set of criteria (e.g., fastest route, shortest route, route with least amount of walking, route requiring least amount of transit vehicle changes, route requiring least amount of transit system changes, etc.), and displays this selected route over the map presentation. In some embodiments, the selection criteria set relies on two or more selection parameters. Also, in some embodiments, the selection criteria set is different in different transit markets and/or in different time periods in the same transit market.

The map application of some embodiments displays the best identified route in its entirety over a portion of a map presentation of a geographical area. The application of some such embodiments displays the identified route in multiple sections (transit legs) each of which is traveled by a particular transit vehicle. The map application uses different graphical representations for different portions of a displayed transit route that are traveled by different types of transit vehicles or require walking. In some embodiments, the different types of transit vehicles that are presented by different graphical representations include buses, subway trains, rail trains (e.g., light rail trains and heavy rail trains), and ferries. Each of these four categories may include multiple different subcategories in some embodiments. When the selected transit route includes multiple transit vehicles of the same type (same transit system), each transit vehicle of the same transit system is distinguished from the other transit vehicles by a different line of the transit vehicle (e.g., a different subway line, a different bus line, etc.).

FIG. 1 illustrates a map application that provides transit navigation presentations of some embodiments of the invention. In some embodiments, the map application executes on a mobile device (e.g., a smartphone, a tablet, a laptop, etc.) with a touch-sensitive display screen. Although, all the features and concepts of the map application discussed below are equally applicable to other devices with non-touch-sensitive display screens. The map application can operate in a map-browsing mode to allow a user to browse a map of a locality and to perform searches for map locations based on addresses, names (e.g., people, businesses, etc.) or other search parameters. The application also has a navigation mode that includes a driving navigation mode to provide driving navigation directions, a walking navigation mode to provide walking navigation directions, and a transit navigation mode to provide transit navigation directions.

FIG. 1 illustrates, in four operational stages 105-120 of the user interface (UI) 100 of the map application, how the transit navigation mode of the map application can be selected by requesting for a route from the current location of the user to a searched destination. The application then displays a route that is traveled by a combination of two different transit vehicles (of two different types) between the current location of the user and the searched destination. Some embodiments provide the user with a search box to search for a particular location. The user may then enter an address of a particular place or alternatively a name of the place in the search box. When the address (or name) of the place is specified, the map application of some embodiments provides an indicator (e.g., a pin) over a presentation of the map to display the exact location of the place on the map presentation. In addition, some such embodiments display a banner (e.g., over the pin) with selectable controls for providing more information about the place.

The first stage 105 of FIG. 1 illustrates a search box 125, a map presentation area 130 that displays a map of a geographical area, a pin 135, and a banner 140. The banner 140 includes a selectable route control 145 (which is depicted as a presentation of a car), a name 150 of the searched place, and a selectable control 155 (which is depicted as a right arrow). In the search box 125, a user can enter a search parameter to search for a particular location for display in the map presentation area 130. In some embodiments, the search parameter can be an address or a name of an entity (e.g., business, organization, person, etc.), or some other parameter. When the map application can identify one or more locations for the search parameter that it receives, the map application in some embodiments (1) displays, in the presentation area 130, a map that displays some or all of the identified locations, and (2) displays a pin 135 or other location indicator for each displayed location to identify the position of the identified location. Also, in some embodiments, the map application displays a banner 140 over one of the pins 135 for providing access to more information about the location identified by the pin. The banner also provides some information about the identified location.

The first stage 105 of the figure shows that the user has entered an address in the search box 125 (123 A Street). As a result, the application displays, in the map presentation area 130, a map of a particular geographical area in which the entered address is located. This stage also shows that the application further displays (1) the pin 135 over the map presentation to identify the location of the entered address on the map and (2) the banner 140 over the pin. As shown, this banner includes the address "123 A Street," the route control 145, and the selectable control 155, which when selected causes the map application to present a display area (e.g., a placecard) that provides more information about the identified location.

The second stage 110 illustrates that the user selects the selectable route control 145 (e.g., by performing a gestural input on the touch-sensitive display screen of the device, such as tapping the user's finger on the control 145). Selection of the route control 145 causes the application to display a route overview (e.g., a driving route) from the current location of the user to the searched location (i.e., to the pin 135) over the map presented in the map presentation area 130. In some embodiments, the route control 145 is also for initiating a navigation experience. For instance, the map application of some embodiments provides one or more routes to the location of the pin from the current location of the device upon receiving a selection of the route control. When a route is selected, the map application can start operating in a navigation mode or in a route inspection mode depending on the user's next selection.

The third stage 115 shows that the displayed route 175 is laid over the region map. The third stage 115 also shows three navigation mode controls, which are the driving mode control 178, the walking mode control 180, and the transit mode control 182. Through these controls, the user can direct the map application to provide one or more driving routes, walking routes, and transit routes from the specified starting location (i.e., the device's current location in this example) to the specified destination (i.e., to 123 A Street in this example). The third stage 115 shows the driving mode control 178 highlighted to indicate that the route 175 that the application initially provides is a driving route. In some embodiments, the map application dynamically determines whether to provide an initial driving, walking or transit route based on the distance to the destination, the locality in which the device currently operates, and the detected current mode of transportation for the device (if any).

The map application of some embodiments makes a dynamic determination for the default mode of navigation based on a set of motion data that it receives through the different sensors of the device and a set of rules that specifies the default mode of navigation under different detected conditions. For instance, the application detects the current user activity (e.g., driving, walking, biking, etc.) from motion data that some detecting sensors of the device collect and based on the determined activity, automatically sets the default navigation mode to the pedestrian mode (i.e., walking mode) or driving mode. For instance if the application determines, based on the motion data it receives from the motion sensors, that the user of the device is in a vehicle, the application sets the default navigation mode to driving mode (as illustrated in this example).

In some embodiments, the map application uses a combination of the motion data that it receives through the motion sensors, and the distance to the desired destination in order to determine which navigation mode should be the default mode. For instance, in some embodiments, the application does not set the default mode to the pedestrian mode when the destination location is not within a threshold distance (e.g., two miles) from the current position of the user even if the motion data indicate that the user is walking. Conversely, the application of some embodiments does not set the default mode to the driving mode when the destination location is within a threshold distance (e.g., 0.5 miles) from the current position of the user and the motion data indicate that the user is not driving.

The third stage also shows that for the displayed route, the map application provides information about the route in a display area 183. For instance, in the driving mode, the display area 183 displays the driving distance and duration to the destination from the current location of the device. The third stage also shows that the route-overview presentation includes a start control 184 for starting a turn-by-turn navigation experience to the destination based on the currently selected navigation mode (e.g., driving mode, walking mode, or transit mode). For example, when the map application is displaying a transit route overview presentation in the transit mode, selection of the start control 184 directs the map application to start a transit navigation presentation that provides transit navigation directions from the device's current location to the destination, which is described in more detail below.

The third stage shows that the user selects the transit control 182 (e.g., by tapping on the tab 182) to change the navigation mode of the application from a driving navigation mode to transit navigation mode. Upon receiving this request, the map application of some embodiments identifies one or more transit routes to the specified destination, selects one of the identified transit routes as the best possible transit route based on a set of criteria, and displays the selected transit route 189, as shown in the fourth stage 120.

The map application of some embodiments, upon receiving a request to display a route in transit mode, identifies the best possible transit route among several different routes between two locations and displays the route to the user. Specifically, to identify the transit routes, the application of some embodiments examines trips that one or more transit vehicles of one or more transit systems make from locations nearby a specified starting location (e.g., the current location of the device) to locations near the specified destination. Based on this examination, the application identifies one or more transit routes that use one or more transit vehicles of one or more transit systems in some embodiments.

After identifying the transit routes, the map application then selects one of the identified transit routes based on a set of criteria (e.g., fastest route, shortest route, route with least amount of walking, route requiring least amount of transit vehicle changes, route requiring least amount of transit system changes, etc.), and displays this identified route over the map presentation in the presentation area 130. In some embodiments, the selection criteria set relies on two or more selection parameters. Also, in some embodiments, the selection criteria set is different in different transit markets and/or in different time periods in the same transit market.

Although in the descriptions above and below, the map application is identified as the performer of actions such as identification and ranking of the transit routes, in some embodiments some or all of these actions are performed by a mapping service, which then provides the results to the map application. For instance, in some embodiments the identification of different transit routes and selection of the best possible route among the identified transit routes is done by a mapping service that runs on one or more dedicated servers.

The mapping service of some embodiments is the same mapping service that provides other map browsing and navigation data (e.g., routing data, traffic data, map tiles, etc.) to the map application. In some other embodiments, the mapping service is a designated service for providing transit data to the map application. The mapping service of some embodiments receives a request for transit routes, which includes the starting and destination locations. The service then identifies a set of available transit routes based on the user preferences, ranks the identified transit routes based on a set of criteria, and returns the ranked identified transit routes to the map application. The map application then displays the highest ranked transit route as the selected transit route in the transit navigation mode to the user.

In some embodiments, the application ranks the identified routes based on the set of criteria and some other factors. For instance, the application initially ranks the identified routes with the shortest transit route having the highest ranking. The application then requests for and receives real time incident (e.g., traffic) data for the identified routes (e.g., from a set of dedicated servers, from a designated incident curator that gathers incident data from different sources, etc.). Based on the received data, the application of some embodiments rearranges the routes and ranks them again for a second time. The application then displays the highest ranked (secondary ranked) transit route in the route presentation area. In some embodiments, as discussed above, a mapping service identifies and ranks the transit routes. In some such embodiments, the mapping service requests the real time incident data from dedicated servers in order to rank the transit routes. In some embodiments, the mapping service gathers and maintains the incident data directly (e.g., through an incident curator module of the mapping service).

The fourth stage 120 illustrates that the route 175 in the previous stage 115, is now replaced by a transit route 189 as a result of selecting the transit navigation mode as the operational mode of the application. The preferred criterion in this example is the least amount of walking and therefore the transit route shown in the figure is selected as the best transit route because it includes the minimal walking distance between the departure point, the transit stations, and the destination point.

In addition to a predefined set of criteria, the application of some embodiments selects the best possible route based on a set of transit preferences set by a user. The user in some embodiments customizes the application by setting or adjusting a set of transit preferences provided by the map application. For instance, in some embodiments, a user may adjust the date and time of the departure to a particular date and time instead of the current time. In some embodiments, the user may prefer a particular type of transit vehicle (i.e., a transit vehicle of a particular transit system) over the other types. For example, the user might rather ride subway trains over buses, or ground transportation over ferry service.

Customizing the route selection is further described in the concurrently filed U.S. patent application Ser. No. 14/869,403 entitled "Map Application with Transit Navigation Mode", which is incorporated herein by reference.

Some embodiments display the best route in its entirety over a portion of a map of a geographical area. Some such embodiments display the route in multiple sections each of which is traveled by a particular transit vehicle. In some embodiments, the map application uses different representations for different portions of a displayed transit route that are traveled by different transit vehicles or require walking. The displayed transit route in the fourth stage 120 includes two different portions 185 and 187. The first portion (leg) of the transit route (i.e., the route portion 185) is traveled by a bus, while the second portion (i.e., the route portion 187) is traveled by a subway train. The two portions are displayed by two different graphical representations (e.g., a bus route representation for the bus portion and a rail representation for the train portion) to differentiate the bus and subway portions from each other. In the discussions below, a transit leg refers to a portion of a transit route that starts or ends with a transit maneuver that requires a transit vehicle change or a walking portion with a minimum threshold distance in a transit route.

In the illustrated example, two small walking portions 197 and 199 are also displayed. Specifically, the walking portion 197 represents the walking distance from the current location of the device (user) 196 to the first transit station (i.e., the first bus stop of the transit route). The second walking portion 199 represents the walking distance from the last transit station (i.e., the last subway station of the transit route) to the destination location. Although these walking portions are part of the path that the user of the device travels to reach the destination, as will be discussed in more detail below, they are not considered as separate legs of the transit route in some embodiments. Some such embodiments identify a walking portion of a transit route as a transit leg of the route only if the walking distance is equal to or more than a threshold length (e.g., more than half a mile, more than one mile, etc.). Any walking portions less than the threshold will not be identified as a walking leg of the transit route in these embodiments.

In some embodiments, the different types of transit vehicles that are presented by different graphical representations include buses, subway trains, rail trains (e.g., light rail trains and heavy rail trains), and ferries. Each of these four categories may include multiple different subcategories in some embodiments. For example, the bus category may include single-deckers, double-deckers, rigid buses, articulated buses, etc. that are provided by the same or different bus service providers. As another example, a light rail train may include many different types of city trains such as streetcars, trams, trolleys, etc. that are provided by the same or different light rail service providers. Additionally, the best route may include multiple transit vehicles of the same type (same transit system) in some embodiments. In such a case, each transit vehicle of the same transit system is distinguished from the other transit vehicles by a different line of the transit vehicle. For example a transit route may include three different bus legs that are serviced by three buses of three different bus lines.

The display area 183 of the third stage 115 is divided in the fourth stage 120 into two display areas 190 and 193. The incident display area 190 currently shows the arrival time at the destination. However, this display area is also for displaying various other transit information that can help the user to plan the transit trip more easily. Displaying different transit information in the display area 190 is further described in the concurrently filed U.S. patent application Ser. No. 14/869,694 entitled "Transit Incidents", which is incorporated herein by reference. A few examples of this additional transit information include (1) any incident that has occurred along the displayed transit route, (2) an incident that has occurred along another route which has caused the displayed route ranked better than the other route, (3) departure time or frequency of departures for the first leg of the transit route, and (4) departure frequency of the entire route.

The display area 193 is for displaying a route summary presentation for the displayed transit route. More specifically, this display area shows a different representation for each transit vehicle for each leg of the transit route along with the line of the transit vehicle. As illustrated in this example, the display area 193 currently shows a representation for a bus of the line 125 that travels the first leg of the transit route and a representation for a subway train of the line 166 that travels the second leg of the transit route.

Each representation for a transit vehicle, in the illustrated example, includes a logo that represents the type of the transit vehicle (e.g., a bus logo, a subway train logo, etc.), and a geometric shape that (1) includes the line of the transit vehicle and (2) is different for different types of transit vehicles (e.g., a rectangle for bus lines, an ellipse for subway lines, etc.). However, one of ordinary skill in the art would realize that the different types of transit vehicles could be represented in different embodiments differently. For example some embodiments provide different colors for the different representations to distinguish them from each other while other embodiments provide different graphical shapes that represent different types of transit vehicles.

The fourth stage 120 also shows a selectable More Routes control 195 for showing more routes. As discussed above, the displayed transit route is the best transit route that the application selects among a set of different routes based on a set of different criteria as well as a set of user preferences. Selecting the control 195 causes the application to show the other routes in the set of different routes in a separate display area, as will be discussed in further detail below by reference to FIG. 2.

As described above, upon receiving a request for transit navigation mode, the map application of some embodiments (or a mapping service that provides map and transit data to the map application) identifies one or more transit routes to the specified destination, selects one of the identified transit routes as the best possible transit route based on a set of criteria, and displays the selected transit route. To identify the transit routes, the application of some embodiments examines trips that one or more transit vehicles of one or more transit systems make from locations nearby the current device's location to locations near the specified destination. Although the map application identifies and displays the best route among several identified routes, the user of the map application of some embodiments is able to view and select the other identified routes as well. In some embodiments the user can change the best displayed route with one of the other identified transit routes between the starting location and the destination location.

Figure 2:
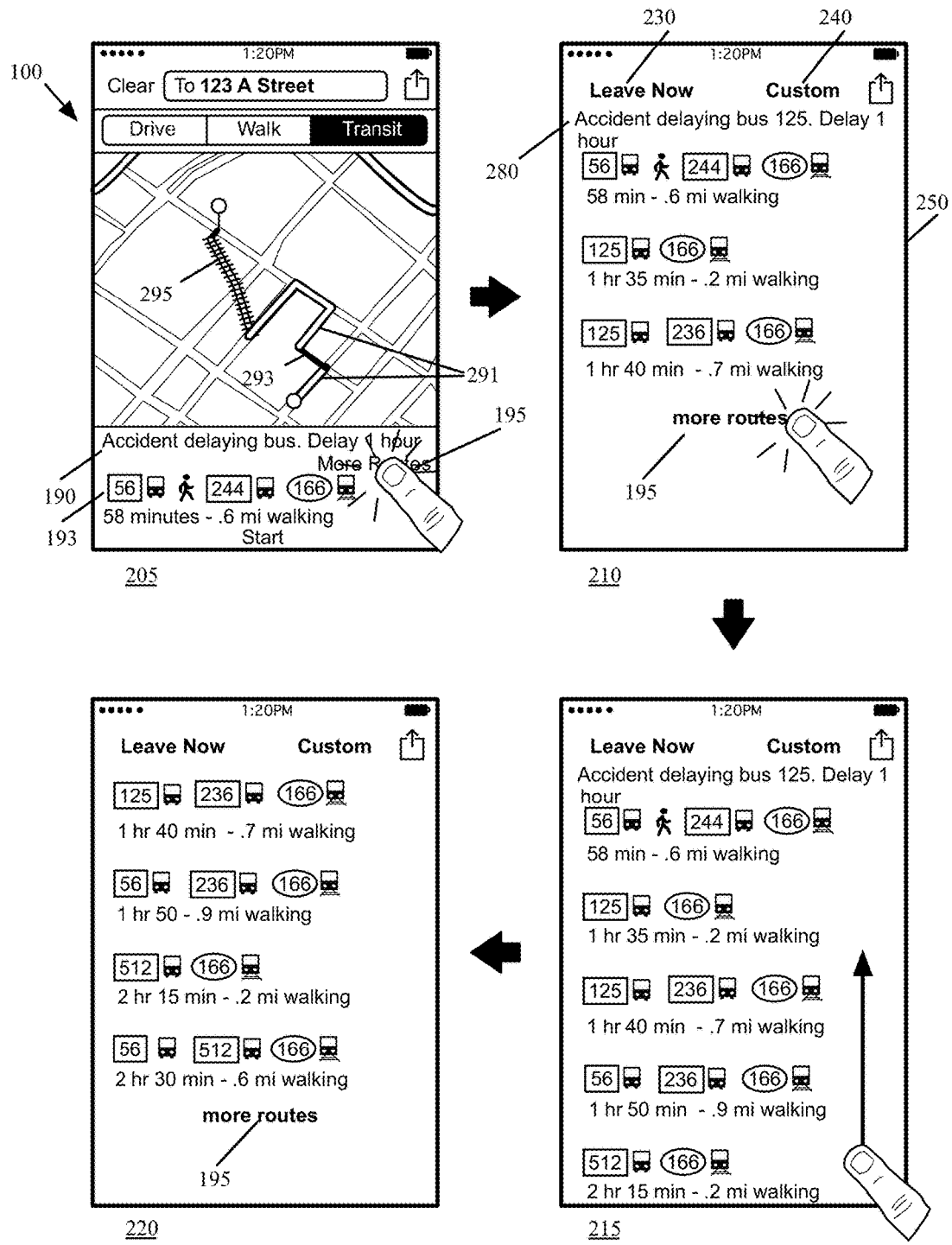
FIG. 2 illustrates a user selecting the More Routes control to view the other identified transit routes between the current location of the device and the destination location.

FIG. 2 illustrates in terms of four operational stages 205-220 of the map application UI 100, a user selecting the More Routes control 195 to view the other identified transit routes between the current location of the device and the destination location. The first stage 205 shows a map application UI 100 that includes a representation of the best identified route that is drawn over a portion of the map presentation. The identified transit route includes two different bus legs 291, a walking portion 293, and a subway leg 295. This stage also shows that the route summary display area 193 displays a transit route summary representation that includes a bus representation for the bus of the line 56, a walking person representation for the walking portion, a bus representation for the bus of the line 244, and a subway train representation for the subway leg of the transit route. This stage also shows that the user is selecting the More Routes control 195 (e.g., by tapping on the UI control 195).

The second stage 210 illustrates that selection of the control 195 directs the map application to provide a separate display area 250 in order to display the additional identified transit routes. As described above, the identified available transit routes in some embodiments are ranked based on a set of criteria (e.g., the quickest route, the shortest route, etc.) and the initially displayed route is the highest ranked transit route among the identified routes. In the illustrated example, the criterion of ranking the transit routes is the shortest trip duration. Therefore, in this example, the displayed route is a transit route with trip duration of 58 minutes.

After selection of the control 195, the second stage 210 shows that the more routes display area 250 now displays two additional route summary presentations besides the initially displayed route summary presentation that was displayed in the first stage. This stage also shows that the incident report 280 is shown at the top of the display area and before the route summary presentation. In some embodiments, the incident report shown in the more routes display area is a more complete version of the incident report displayed in the route planning display area (i.e., the route presentation display area 130 of the first stage). As illustrated, the route summary now shows that the accident has occurred in the bus leg (bus line 125) of the second transit route and consequently this transit route, because of the delay, is now the second best route among the identified routes.

The three transit route summary presentations are shown in the more routes display area 250 based on their rankings (i.e., sorted from the shortest trip duration to the longest trip duration). Although not shown, some embodiments display additional information in the display area 250 for each route summary presentation. For example, some embodiments display, in front of route summary presentation, departure time or frequency of departures of the first transit line in the corresponding route summary. Alternatively, or conjunctively, some such embodiments display the departure frequency of the entire route for each route summary. Other embodiments display other information such as an incident report for each route summary (if there is any). Computing and displaying the departure frequencies of some embodiments are described in the concurrently filed U.S. patent application Ser. No. 14/869,684 entitled "Frequency Based Transit Trip Characterizations", and U.S. patent application Ser. No. 14/869,699 entitled "Frequency Based Transit Trip Characterizations", which are incorporated herein by reference.

The second stage 210 also shows two more selectable UI controls which are the Leave Now UI control 230 and Custom UI control 240. This stage further shows a More Routes control 195 that is displayed at the end of the current route summary presentations. Selection of the Leave Now UI control 230 in some embodiments directs the map application to (1) change all the customized temporal settings to the current date and time and (2) return to displaying the UI of the map application in the first stage 205. In some other embodiments, selection of the UI control 230 directs the map application to only change all the customized temporal settings to the current date and time. Selection of the Custom UI control 240 directs the map application of some embodiment to provide a custom display area for modifying a set of transit preferences.

In some embodiments, the map application provides a More Routes UI control 195 in the display area 250 after it shows a specific number of transit routes in this display area (e.g., after each three transit routes). This stage also shows that the user selects the UI control 195 to view even more identified routes. The third stage 215 shows that as a result of selection of the control 195 in the more routes display area 250, two more available route summary presentations with lower rankings (i.e., higher trip duration) are displayed in the display area 250. This stage also shows that the user scrolls the display area up to show additional transit routes that did not fit in the display screen of the device.

The fourth stage 220 shows that the display area is scrolled up and is now displaying all the three new transit route summary presentations. This stage also shows that at the end of the displayed transit routes, the More Routes control 195 is displayed again for viewing the next additional transit routes (if any). This stage also shows that the incident report 280 is not displayed in the more routes display area as a result of scrolling the route summaries. However, in some embodiments, the incident report 280 always stays on top of the more routes display area even after scrolling the transit routes. Some embodiments display three additional routes each time the control 195 is selected. Moreover, although not shown, some embodiments provide additional selectable UI controls for interaction with the displayed route summaries. For example, some embodiments display a Share control next to each route summary presentation for sharing the corresponding route summary with one or more other persons.

In some embodiments, when a user selects a presentation of a route summary (e.g., by tapping on the presentation), the map application provides a list view (e.g., a navigation list view) of the transit route that provides a list of detailed instructions on how to navigate the transit route. In some embodiments, each leg of the transit route that is traveled by a transit vehicle corresponds to a pair of navigation instructions in the list view.

More specifically, in some such embodiments, for each leg of the trip (the transit route) that is associated with a different transit vehicle, a first instruction sets forth the name of the transit station (e.g., bus stop, subway stations, ferry terminal, etc.) to board the transit vehicle and the second instruction states the name of the transit station to exit the transit vehicle. Some other embodiments display all the instructions related to a transit leg in one navigation instruction. Some embodiments also provide a navigation instruction for each walking portion (between the stations, from the departure point to the first station, and from the last station to the destination) of the transit route.

In some embodiments, in between each pair of instructions for a particular leg (portion) of the route, other information related to that particular leg is displayed. For example, in some embodiments, between the two instructions of each pair, the map application describes the distance associated with the leg, the number of transit stations (e.g., bus stops) while on the transit vehicle, and a total travel time for the leg. Additionally, the map application of some embodiments sets forth the required walks between the legs of the trip by presenting the walking distance and time between each leg that is associated with a transit vehicle.

Some embodiments provide the transit navigation instructions differently. For example, in some embodiments each instruction in the list is for a next transit maneuver of the passenger and therefore each walking instruction appears as a separate instruction in the list and not in between each pair of instructions. Additionally, some embodiments provide different transit information between each pair of instructions, or alternatively do not provide any additional information between the instructions.

Figure 3:
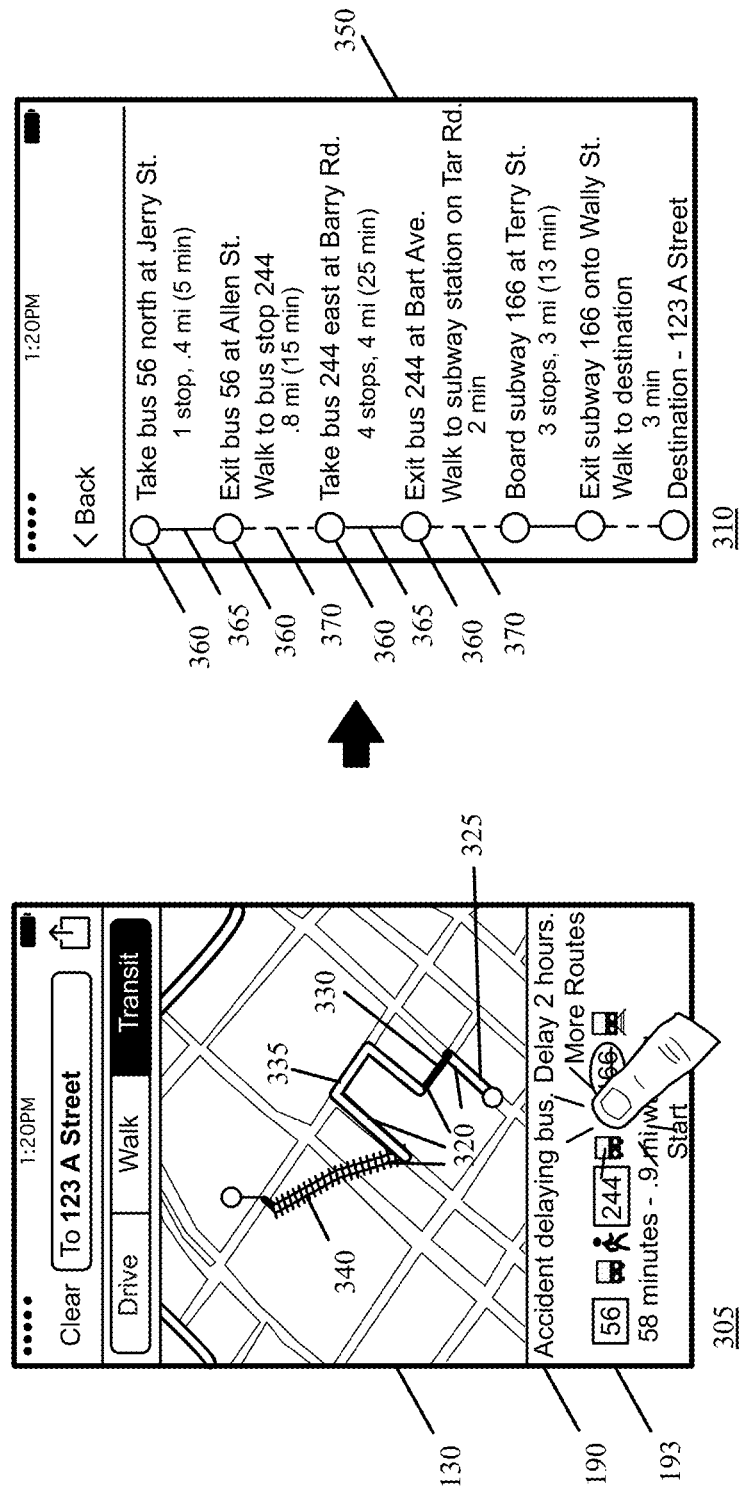
FIG. 3 illustrates how selection of a transit route summary representation directs the map application of some embodiments to provide a list of navigation instructions associated with a selected transit route.

FIG. 3 illustrates an example of one such transit route list view in some embodiments. This figure illustrates, through two operational stages 305-310 of the UI of the map application of some embodiments, that selection of a transit route summary representation directs the map application of some embodiments to provide a list of navigation instructions associated with the selected transit route. The first stage 305 shows a representation of the best identified route 320 drawn over a portion of the map presentation displayed in the map presentation area 130. The identified transit route 320 includes two different bus legs 325 and 335, a walking portion 330, and a subway leg 340.

The first stage 305 also shows that the route summary display area 193 displays a transit route summary representation that includes a bus representation for the bus of the line 56 that travels the leg 325, a walking person representation for the walking portion 330, a bus representation for the bus of the line 166 that travels the leg 335, and a subway train representation that travels the leg 340 of the transit route. The incident display area 190 displays that an accident is delaying a bus line (e.g., the bus line 125 depicted in the fourth stage of FIG. 1). Lastly, the first stage 305 shows that the user selects the transit route summary representation presented in the transit route summary display area 193 (e.g., by tapping on the transit route summary display area).

The second stage 310 shows that upon selection of the transit route summary representation in the previous stage, the map application provides a list of navigation instructions for the transit route in a list view display area 350. The list view display area 350 is a scrollable display area and the user can scroll up and down to view next and/or previous information. As described above each pair of instructions in the list is associated with a particular leg of the trip traveled by a particular transit vehicle in some embodiments. Additionally, the map application of some embodiments displays representations of the walks that are required to go (1) from the current location (of the user) to the first transit station (e.g., bus stop, subway station, etc.), (2) between the transit stations of two consecutive legs of the trip, and (3) from the last transit station to the desired destination.

The second stage 310 shows that the map application displays in the list view display area 350 three legs 365 of the route that are depicted by solid lines and three walking distances 370 that are depicted by dashed lines. Each pair of instructions 360 in the set of instructions includes the information for boarding a transit vehicle at a first transit station and exiting the transit vehicle at a second transit station. For example, the first two instructions 360 of the illustrated example instruct the user of the device to take the bus 56 northbound at Jerry Street and then exit the bus 56 at Allen Street. Similarly the second pair of instructions in the illustrated example instructs the user to take the bus 244 eastbound at Kellie Street and exit the bus 244 at Bart Avenue.

Giving the name of the boarding and exiting transit stations, however, might not be enough and a passenger can easily get confused about how many more stations the passenger should travel with the transit vehicle before exiting the transit vehicle. In order to help the passenger (user) even more, the map application of some embodiments also displays additional information about each leg 365 of the route next to the leg. For example, the information next to the first leg 365 of the illustrated example, provides the passenger with the number of bus stops (1 bus stop), the distance that should be traveled by the bus 56 (0.4 miles), and the estimated time of travel (5 minutes).

The second stage 310 also shows that the map application provides the walking instructions in form of dashed lines 370 in between each pair of instructions 360. The walking instructions describe the walking distance and time between each pair. For example, the first walking instruction 370 instructs the user to walk 0.6 miles (about 15) minutes after the user exits the bus 56 in order to reach the next bus stop for the second leg of the trip. The map application of some embodiments also provides the walking instructions between the current location of the user and the first transit station (not shown) and between the last transit stations and the destination (i.e., the last walking instruction 370).

One example of displaying a list view and the different types of information and instructions shown in the list view in some embodiments was described through the second stage 310 of FIG. 3. However, the type of information and the way this information is displayed may be different in different embodiments. For example, in some embodiments some or all of the additional information about a leg of a trip that is displayed next to the leg 365 in the list view is different from what is shown in this stage. For instance, some embodiments do not provide the number of stations during each trip while some other embodiments provide more information such as the name of each station while traveling on a particular transit vehicle. Various embodiments may include other combinations of this information and the displayed information.

Furthermore, the information provided in the instructions 360 is different in different embodiments. For example, some embodiments provide local directional terms that are used in each locality for different cardinal points in each instruction that involves boarding a transit vehicle. In the illustrated example, if the local term "uptown" is used for the vehicles that head "north," some such embodiments would display "take bus 56 uptown . . . " for the first instruction 360, instead of displaying "take bus 56 north . . . " The labeling of directions based on the locality in which the transit route is displayed is described in the concurrently filed U.S. patent application Ser. No. 14/869,403 entitled "Map Application with Transit Navigation Mode", which is incorporated herein by reference.

Additionally, some embodiments provide a departure time of each transit vehicle in the first instruction of each pair of instructions 360. In some embodiments, the format in which the departure time is displayed depends on whether the transit vehicle is characterized as a high frequency or low frequency transit line. In some embodiments, different transit lines of a transit route are characterized as high frequency transit lines and low frequency transit lines. In some such embodiments a first transit line (e.g., a first bus line) can be categorized as a low frequency transit line at a particular transit station, while a second different transit line (e.g. a second bus line) can be categorized as a high frequency transit line at the particular transit station at the same time.

Figure 4:
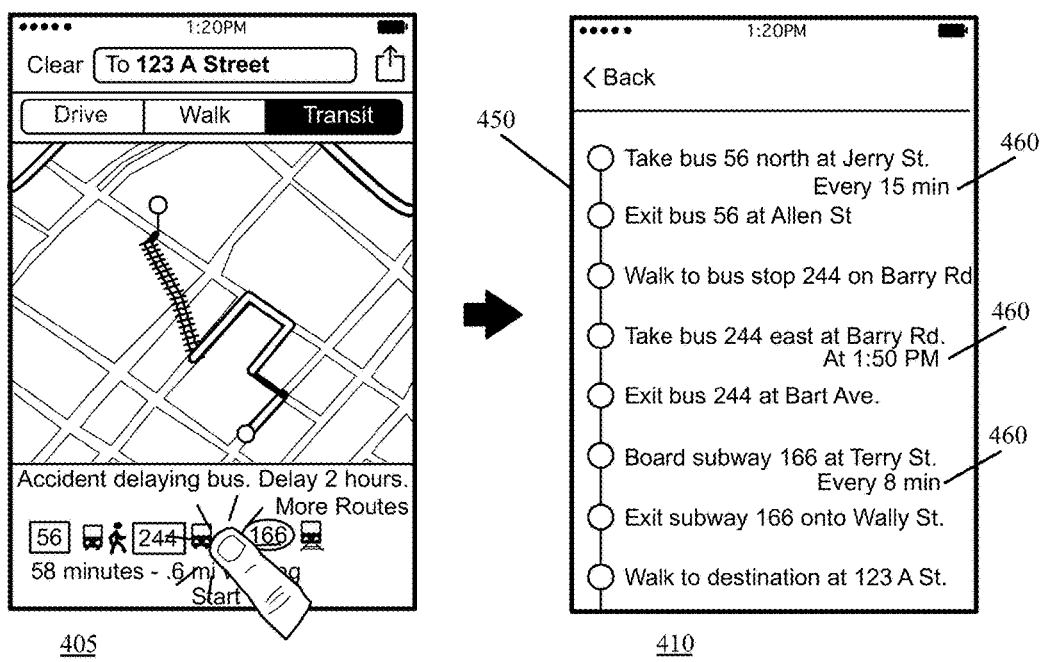
FIG. 4 illustrates another example of a list of navigation instructions associated with a selected transit route.

FIG. 4 illustrates another example of a list of navigation instructions associated with a selected transit route. This figure illustrates, through two operational stages 405-410 of the UI of the map application of some embodiments, that selection of a transit route summary representation directs the map application of some embodiments to provide a list of navigation instructions associated with the selected transit route. The first stage 405 shows an identical UI of the application as the UI shown in the first stage of FIG. 3. The route summary displays a transit route summary representation that includes a bus representation for the bus of the line 56, a walking person representation for the walking portion, a bus representation for the bus of the line 166, and a subway train representation that travels the last leg of the transit route. The first stage 405 also shows that the user selects the transit route summary representation presented in the transit route summary display area 193 (e.g., by tapping on the transit route summary display area).

The second stage 410 shows that upon selection of the transit route summary representation in the previous stage, the map application provides a list of navigation instructions for the transit route in a list view display area 450. The list view display area 450 is a scrollable display area and the user can scroll up and down to view additional information. Each navigation instruction in the list is associated with a particular leg of the trip traveled by a particular transit vehicle or a walking portion of the transit route in some embodiments. That walking portions of some embodiments are the walking distances that are required to go (1) from the current location (of the user) to the first transit station (e.g., bus stop, subway station, etc.), (2) between the transit stations of two consecutive legs of the trip, and (3) from the last transit station to the desired destination.

The second stage 410 also shows that the map application displays in the list view display area 450 a navigation instruction for each next transit maneuver in the transit route. Specifically, each navigation instruction in the list includes instructions for (1) a walking portion to reach the next transit station of the next leg of the transit route, (2) boarding the next transit vehicle that services the next leg, (3) exiting the transit vehicle, and (4) walking portion to the destination. Additionally, for each next transit vehicle, the navigation instruction provides the departure time 460 of the transit line. As described above and below, the departure time can be in the form of frequency of departures for high frequency transit lines (e.g., bus line 56 and subway line 166) or departure time of the next transit vehicle from the station (e.g., bus line 244). As stated before, this is one example of the navigation list view of some embodiments. Some embodiments provide more information in the instructions of the list view. For example, some embodiments display each transit leg's duration or each walking portion's duration in the navigation instructions.

As described above, in some embodiments, different transit lines of a transit route are categorized into two categories of high frequency transit trips and low frequency transit trips. In some such embodiments a first transit trip (e.g., a first bus line) can be categorized as a low frequency transit line at a particular transit station, while a second different transit trip (e.g. a second bus line) can be categorized as a high frequency transit line at the particular transit station. Conversely, in some embodiments, a transit line can be categorized as a high frequency transit line at a particular transit station during a first time period (e.g., on even days of the week, in the mornings, between two particular hours, etc.), while the same transit line can be categorized as a low frequency transit line at the same particular station but during a second different time period (e.g., on odd days of the week, in the evenings, between two particular hours, etc.).

The map application of some embodiments treats the high frequency transit lines differently than the low frequency transit lines. For example, the application presents the departure times of high frequency transit vehicles in a first manner while it presents the departure times of low frequency transit vehicles in a second different manner in different display areas of the UI of the application. Additionally, the application of some embodiments classifies high frequency transit lines into different classes and presents the frequency of departure for each class differently. Characterizing the transit lines as high frequency transit lines and low frequency transit lines and computing the frequency of departures of a particular transit line are done by a mapping service that runs on one or more dedicated servers in some embodiments.

In order to determine the frequency of departures of a transit line from a transit station during a particular time period, the mapping service of some embodiments first determines whether the transit vehicles of the line depart from the transit station on average at least once during a certain time period (e.g., every 30 minutes for at least 2 hours). This certain time period can be different in different areas or for different transit lines of the same or different transit systems. When the mapping service of some such embodiments determines that the vehicles of the transit line depart at least once during the certain time period, the service categorizes the transit vehicles of the line as high frequency transit vehicles. The mapping service then computes the frequency of departures for high frequency transit lines.

In order to compute the frequency, the mapping service of some embodiments first identifies the time intervals between each pair of departures of the transit vehicles of the line that head the same direction from the same transit station during a particular time period. The service then applies a series of mathematical functions and formulas to the identified numbers (i.e., the sequence of the gaps between the departure times) in order to calculate the frequency of departures for the line. In some embodiments the calculated departure frequency can be a value (number) that represents the exact frequency of departures (e.g., every 5 minutes), a number that represents an approximation of frequency of departures (e.g., about every 5 minutes), or a range of numbers (e.g., every 5-8 minutes). Some embodiments first determine whether an exact frequency can be used, then determine (if no exact frequency is found) whether one of a set of frequency ranges can be used, and only attempt to find an approximate frequency value if the first two options are unsuccessful.

For a high frequency transit line, the map application of some embodiments displays the departure time of the line in a frequency format (e.g., in the navigation instruction displayed in a navigation banner). That is, the application displays the frequency of departures of the transit vehicles of the line (e.g., every 5 minutes, 5-10 minutes, about 10 minutes, etc.) from the transit station. For a low frequency transit line, however, the map application of some such embodiments displays the departure time in an absolute time format. That is the map application displays the time at which the transit vehicles of the line leave the station (e.g., at 2:30 pm, at 3:30 pm). Characterizing transit lines as high and low frequency transit lines and the different treatments of high and low frequency transit vehicles are described in further detail in the concurrently filed U.S. patent application Ser. No. 14/869,684 entitled "Frequency Based Transit Trip Characterizations", and incorporated herein by reference, and U.S. patent application Ser. No. 14/869,699 entitled "Frequency Based Transit Trip Characterizations", and incorporated herein by reference.

As described above, the map application of some embodiments can operate in one or more different modes such as map browsing mode, routing mode, navigation presentation mode, etc. The map-browsing mode allows a user to browse a map of a locality and to perform searches for map locations based on addresses, names (e.g., people, businesses, etc.) or other search parameters. The navigation presentation mode of some embodiments includes a driving navigation mode to provide driving navigation directions, a walking navigation mode to provide walking navigation directions, and a transit navigation mode to provide transit navigation directions.

When a user starts navigation in the transit navigation mode (e.g., by selecting a start navigation control), the map application of some embodiments provides a transit navigation presentation that displays instructions for each transit maneuver (e.g., in a transit leg) of a transit trip. As described above, a transit leg refers to a portion of a transit route that starts or ends with a transit maneuver that requires a transit vehicle change or a walking portion of the transit route (i.e., between two transit vehicle portions, or at the start or end of a transit route).

The different transit maneuvers in some embodiments include boarding a transit vehicle of the transit route, exiting a transit vehicle, walking to a transit station, and walking to the destination of the transit route. Some embodiments combine the navigation instructions for two or more transit maneuvers that relate to the same transit leg. For example, some embodiments display a single navigation instruction for walking to a transit station and boarding a transit vehicle at the station. Some other embodiments, on the other hand, provide a separate navigation instruction for entering each transit station of a transit route.

In some embodiments, a transit navigation presentation provides navigation instructions that specify navigation maneuvers that use one or more transit vehicles (e.g., buses, rapid-transit train vehicles, commuter-rail vehicles, long-distance train vehicles, ferries, etc.) as the device traverses a transit route from a starting location to a destination location. The transit navigation presentation in some embodiments also includes walking instructions that provide directions to transit stations or from transit stations. In some embodiments, the map application displays navigation banners to provide navigation instructions during a transit navigation presentation.

In some embodiments, the map application allows a user to select and scroll through a set of navigation banners representing the different transit maneuvers of a selected transit route when the user starts the navigation presentation mode. As the user scrolls through each navigation banner (e.g., by swiping the navigation banner to the left or right), the portion of the route (e.g., a transit leg) associated with the currently in-focus navigation banner is presented to the user in a second display area. A representation of the currently displayed transit maneuver in the second display area of some embodiments is highlighted on the transit route (e.g., through color highlighting).

In some embodiments, the representation of the transit leg in the second display area (i.e., the representation of the transit leg drawn over a portion of the map that corresponds to the transit maneuver) is augmented to display more details about the transit maneuver on the map. Additionally, some embodiments prioritize road labels based on proximity to transit maneuvers and the current displayed maneuver. That is, in some embodiments, the road labels (e.g., street signs) that correspond to the transit maneuver are displayed in the second display area over a portion of the map that is related to the displayed navigation banner in the first display area.

Figure 5:
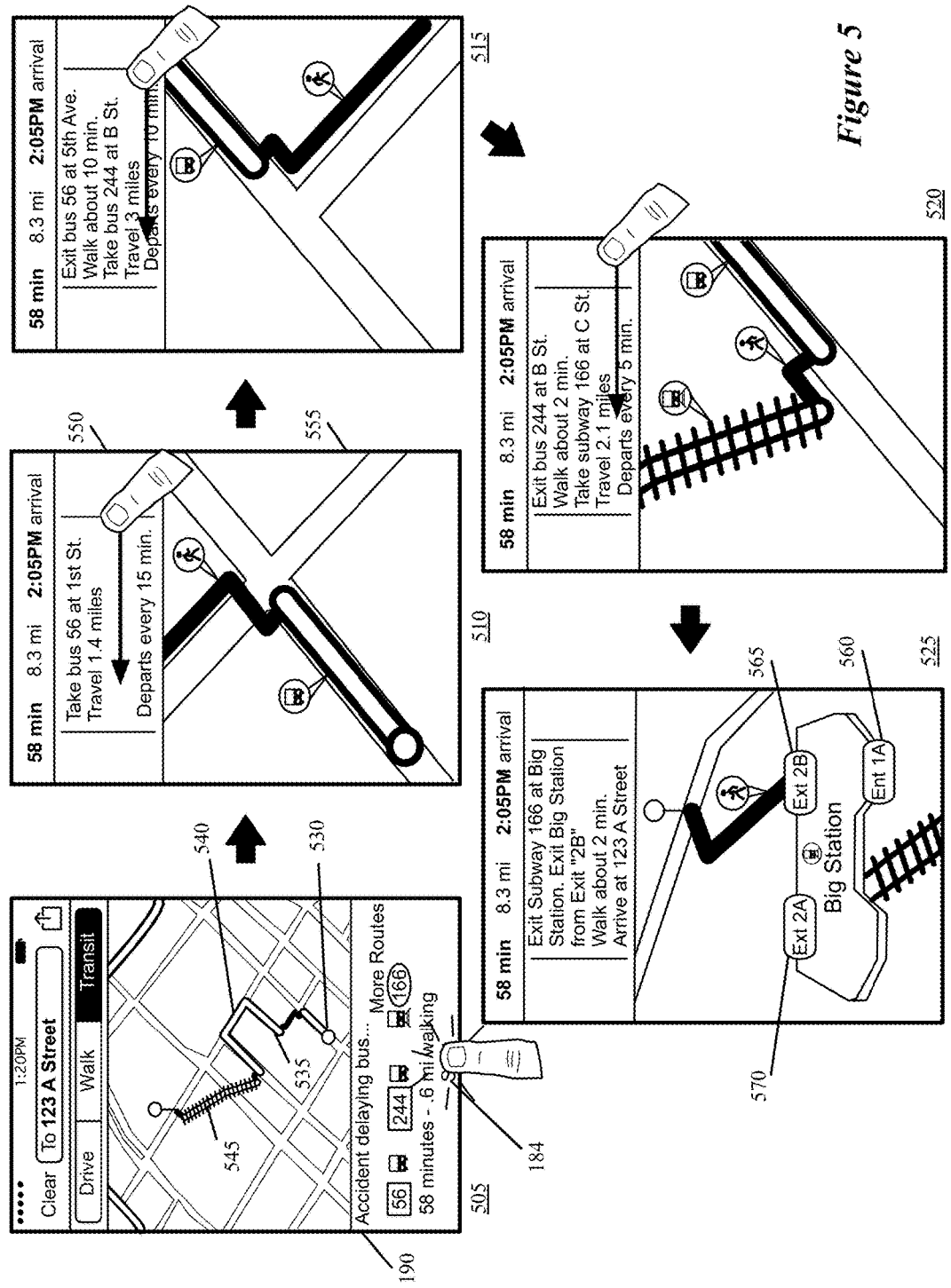
FIG. 5 illustrates a navigation presentation that provides transit navigation directions from the device's current location to the destination.

In some embodiments, each navigation banner provides a navigation instruction for a transit maneuver related to one leg of the transit route. In some embodiments the transit leg includes a portion of the transit route that is traveled by a different transit vehicle or a portion of the transit route that is walked for more than a particular distance. When the map application is displaying a transit route overview presentation (such as the one shown in the fourth stage 120 of FIG. 1), the selection of Start control 184 directs the map application to start a transit navigation presentation that provides transit navigation directions from the device's current location to the destination. FIG. 5 illustrates an example of such a transit navigation presentation in terms of five operational stages 505-525 of map application UI.

The first stage 505 illustrates a representation of a transit route between a starting location and a destination location that is drawn over a portion of a map of a region after a user selected the transit navigation mode. The representation of the transit route includes three different transit legs 535-545. In the illustrated example, the first and second transit legs 535-540 (i.e. the first and second portions of the transit route) are traveled by two buses of different lines while the third transit leg 545 is traveled by a subway train. The first stage 505 also shows a representation 530 of the current location of the device. As shown, the device is currently located at the first transit station (i.e., the first bus stop) of the transit route, hence no walking distance is presented between the current location of the user and the first transit station.

The incident display area 190, in stage 505, displays an incident report that might be related to the currently displayed transit route or the reason for not displaying another transit route. As stated above, the incident reports and the different information displayed in the incident display area of some embodiments are described is further detail in the concurrently filed U.S. patent application Ser. No. 14/869,694 entitled "Transit Incidents", which is incorporated herein by reference. The route summary display area 193 shows two bus representations of different lines 56 and 244 that travel the first and second legs of the transit route and a subway train representation of the line 166 that travels the last leg of the transit route. The route summary display area also shows that the total trip time is 58 minutes which includes a total walking distance of 0.6 miles. The first stage 505 further shows that the user selects the Start control 184 to start a navigation presentation experience.

The second stage 510 shows the initiation of the transit navigation presentation after selection of the Start control 184. As shown, the transit navigation presentation in some embodiments includes one or more navigation banners and one or more maneuver map views. In some embodiments, each navigation banner corresponds to one maneuver map view. In some such embodiments each maneuver map view and its associated navigation banner provide pictorial and text instructions that describe a transit navigation maneuver, which typically is associated with a transit leg of the transit route. For example each pair of navigation banner and map view corresponds to a starting point of a transit leg or an ending point of a transit leg. In some embodiments, a pair of navigation banner and map view may also correspond to a walking leg of a transit route (e.g., when the walking distance is more than a certain distance), an entire leg of a transit route that is traveled by a transit vehicle (e.g., instructions for entering and exiting the transit vehicle), a transit station along the transit route (e.g., when the transit station has multiple entrances and or exits), etc.

Some embodiments provide navigation instructions (e.g., in a navigation banner) intelligently based on the position of the device. These embodiments detect the current position of the user and provide a text (and/or pictorial) instruction that is related to the current position of the user. For example, when the user is detected to be outside a transit station, some embodiments provide a text (and/or pictorial) instruction that instructs the user to "enter" the transit station. On the other hand, when some such embodiments detect the position of the user to be inside the transit station, the embodiments provide a text (and/or pictorial) instruction (e.g., in a navigation banner for the same transit leg of the route) that instructs the user to "board" the transit vehicle.

As shown in the second through fifth stages 510-525, the user of the device can swipe through the navigation (instruction) banners to see successive transit navigation maneuver views along the transit route. Specifically, the second stage 510 shows, after the user has started the navigation presentation, a scrollable navigation banner displayed in the banner display area 550 that provides a navigation instruction for the first bus leg 535 of the transit route. Additionally, the first maneuver map view that is associated with the first transit leg is displayed in the map view display area 555. The maneuver map view for the first leg includes a bus route representation for bus line 56 along with a walking portion after the user exits the bus. Some embodiments, as described above, also prioritize and display in the map view (although not shown in the illustrated example) the road labels (e.g., street signs) of the roads that are in the proximity of the transit maneuver.

As described above, each transit leg of the transit route, in some embodiments, includes a portion of the transit route that is traveled by a different transit vehicle, which can further include a start or end of a walking portion of the transit route. When the device's location is within one or more of the maneuver map views, the map application of some embodiments displays the device's location on the map view(s) so that the user can orient him/herself with the required transit navigation maneuvers. For instance, the map application of some embodiments displays the device's location on a walking leg in the map view display area when the application determines that the user who is holding the device is walking along the walking leg, the representation of which is currently displayed in the map view display area.

When the map application of some embodiments determines that the device is on a walking portion of the transit route that is longer than a particular threshold distance, the map application automatically presents a walking direction indicator to identify the orientation of the device with respect to the desired walking-navigation direction of the walking portion of the route. As the walking-navigation direction changes, the user of the device can properly orient himself/herself along the desired walking direction by aligning the walking-direction indicator with the desired walking direction.

In addition to, or instead of, providing a walking-direction indicator during the walking portion of a transit navigation presentation, the map application of some embodiments provides a user selectable option to switch to the walking navigation presentation in order to obtain a richer walking navigation experience (e.g., to obtain turn-by-turn walking navigation instructions). In some embodiments, the application provides the option to switch to a walking navigation presentation during the transit navigation presentation as a selectable user-interface (UI) item in a navigation banner (e.g., in the navigation banner that corresponds to the walking portion). The application provides this option in some embodiments through other mechanisms, such as voice input instructions that (through a speech recognition interface of the device) direct the navigation application to switch from the transit navigation presentation to a walking navigation presentation. Switching between a transit navigation presentation and a walking navigation presentation during a walking portion of a transit route is further described in the concurrently filed U.S. patent application Ser. No. 14/869,691 entitled "Walking Guidance During Transit Navigation", which is incorporated herein by reference.

The navigation instruction in each navigation banner describes the associated transit maneuver and provides some information about this maneuver. For instance, in the second stage 510, the navigation banner that is displayed in the display area 550 describes the bus line and bus stop that starts the transit trip, the distance traveled by the first bus, and the frequency of departures of the buses of this line. As described above, the application of some embodiments first identifies whether the transit vehicle that travels each leg of the trip is a high frequency transit vehicle or a low frequency transit vehicle. In these embodiments, the application provides, in the navigation banner, the frequency of departures when the transit vehicle is a high frequency transit vehicle, and the departure time of the next transit vehicle of the line when the transit vehicle is a low frequency transit vehicle.

In some embodiments, the transit maneuver banners provide other information than what is depicted in this example figure. For example, some embodiments provide the amount of required walking in terms of time instead of distance, while other embodiments provide both time and distance for the walking portion as well as each leg of the trip. Additionally, some embodiments do not provide the departure schedule of the transit vehicle in every banner while other embodiments provide additional information about the transit trip or the transit vehicle associated with a particular section of the transit trip in the navigation banner. The second stage 510 also shows that the user is swiping through the first navigation banner in order to see the next banner in the sequence. In some embodiments, a user swipes through the navigation banners by touching (contacting) the touch-sensitive display screen of the device with one or more fingers and dragging the finger(s) to the left or right on the display screen to scroll the screen to left or right, respectively.

The third stage 515 shows that as a result of the user's swipe gesture on the banner display area 550, the first navigation banner has scrolled out of the display screen and a second navigation banner that provides navigation instruction for the second leg of the transit route is scrolled in and displayed in this display area. The navigation instruction for the second transit leg includes the bus stop at which to exit the bus line 56, the walking distance to the next bus stop, the line and the bus stop for the next leg of the trip, the total travel distance of the next leg, and the departure schedule of the next bus line.

The third stage 515 also shows that the map view display area 555 displays the second maneuver map view that is associated with the second transit leg. The maneuver map view for the second leg in this stage includes a bus route representation for the bus line 244 along with a walking portion to the bus stop for this line. Although in the illustrated example the navigation instruction is for the combination of three different transit maneuvers (i.e., exiting the bus 56, walking for 10 minutes, and taking the bus 244), as described above, some embodiment provide three different banners each of which includes a navigation instruction for one of these three transit maneuvers. The third stage 515 further shows that the user is swiping the second navigation banner to the left in order to see the next navigation banner in the sequence and its associated maneuver map view.

Additionally, as described before, some embodiments provide more (detailed) instructions when the walking distance in a walking portion of the transit route is more than a certain amount (i.e., more than a threshold distance). For instance, in the illustrated example, if the walking distance between the first leg (bus line 56) and the second leg (bus line 244) was more than a certain distance (e.g., 1 mile) and/or covered a series of different maneuvers (e.g., covered several turns on different streets), then some embodiments provide one or more pairs of navigation banners and their associated map views for that walking portion alone.

The fourth stage 520 shows that the banner display area 550 now displays a third navigation banner that provides navigation instructions for the third leg of the transit route. This navigation banner is scrolled into the display area and the last navigation banner is scrolled out of the display area 550 after the user swipes through the previous navigation banner. The navigation instruction for the third transit leg includes the bus stop to exit the bus 244, the walking distance to the next transit station, the line and the transit station for the next leg of the trip, the total travel distance of the next leg, and the departure schedule of the subway trains of this line.

The fourth stage 520 also shows that the map view display area 555 displays the third maneuver map view that is associated with the third transit leg 545. The maneuver map view for the third leg includes a subway route representation for the subway line 166 along with a walking portion to the subway station for this line. Although in the illustrated example the navigation instruction in the banner is for the combination of three different transit maneuvers (i.e., exiting the bus 244, walking for 2 minutes, and taking the subway 166), similar to the third stage, some embodiments may provide three different banners that each includes a navigation instruction for one of the three transit maneuvers. Some other embodiments display other combinations of the three instructions in their navigation banner display area. The fourth stage 520 further shows that the user is swiping through the third navigation banner in order to see the next navigation banner in the sequence and the maneuver map view that is associated with the next navigation banner.

The fifth stage 525 shows a fourth navigation banner that provides navigation instructions on how to exit the subway station and arrive at the desired destination. In some embodiments, the map application shows a navigation banner that provides navigation instructions on how to enter or exit a transit station when the transit station is a large structure with several entrances and/or exits. In some other embodiments the map application provides a navigation banner for every transit station of a particular transit system (e.g., subway station, train station, etc.). Yet, the map application of some other embodiments does not provide a separate navigation banner for a transit station. In some such embodiments, the application provides the instructions about entrance to, or exit from, a transit station in a navigation banner that is associated with a transit leg that starts from the transit station or ends at the transit station, respectively.

In the illustrated example, the last transit station is a large structure with multiple entrance and exit ways. As such, the last navigation banner of the fifth stage 525 provides navigation instructions for exiting the subway train at the subway station as well as instructions on how to exit from the subway station towards the destination. Specifically, the navigation instruction in the last navigation banner includes the subway station at which to exit the subway train 166, the exit door of the subway station to leave the station, and the walking distance to the destination. The fifth stage 525 also shows that the map view display area 555 displays a representation for the subway station that includes an entrance 560 to the subway station and two exits 565 and 570 from the station. The display area 555 also displays the walking portion representation on the map which takes the user from the exit 565 of the subway station to the destination.

Figure 6:
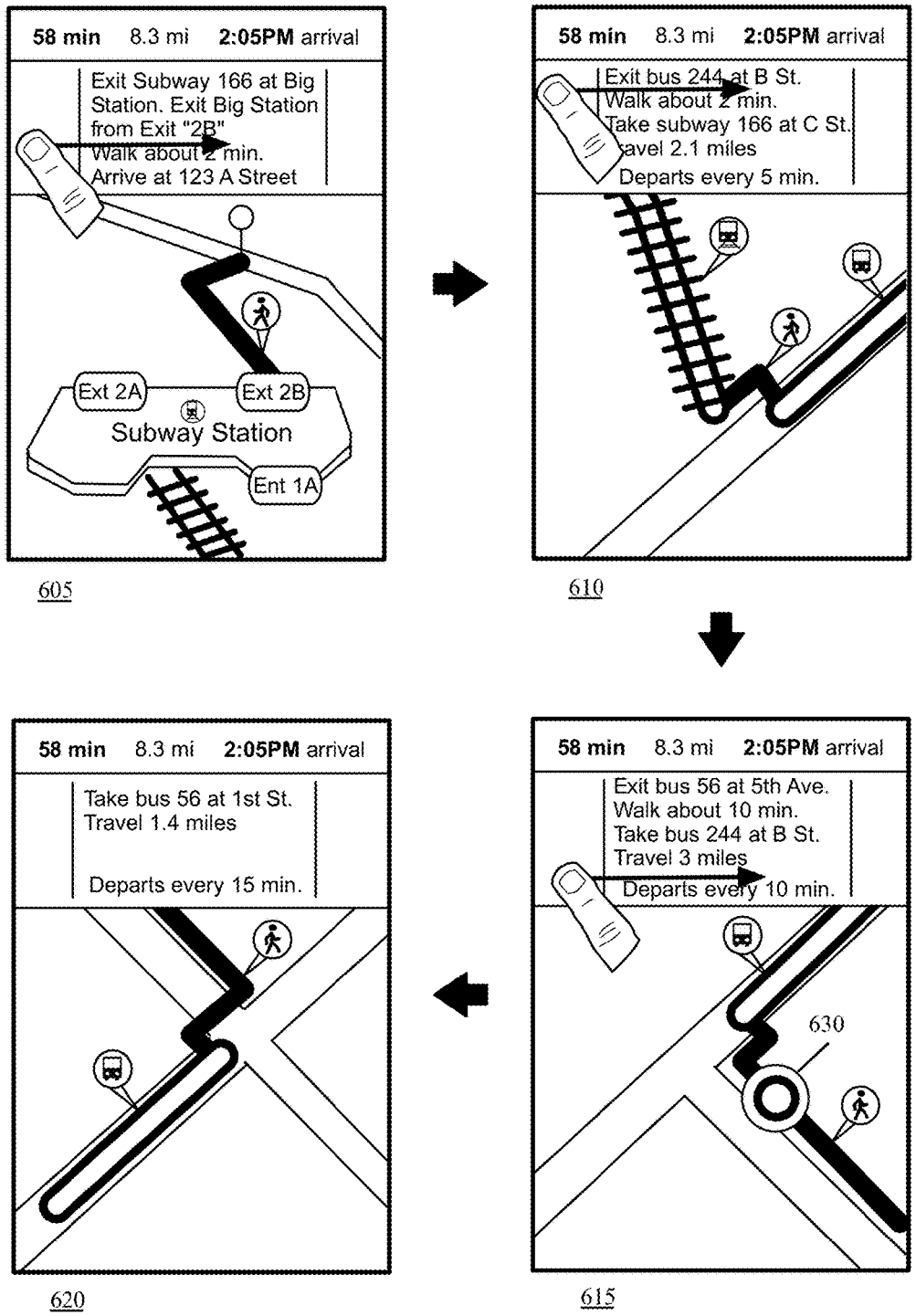
FIG. 6 illustrates an example of displaying the current location of the device while scrolling through the different navigation banners of a navigation presentation.

As described above, when the device's location is within one or more of the maneuver map views, the map application of some embodiments displays the device's location on the map view(s) so that the user can orient him/herself with the required transit navigation maneuvers. FIG. 6 illustrates an example of displaying the current location of the device while scrolling through the different navigation banners of a navigation presentation. This figure shows, in terms of four operational stages 605-620, when a map view covers a geographical area in which a user is currently holding the device, the maneuver map view displays the current location of the device on the map presentation when a corresponding navigation banner is displayed on the device.

In the first stage 605 the figure shows the same map application UI that was shown last in the fifth stage 525 of FIG. 5. This stage shows the same navigation banner as shown in the previous figure after scrolling through all the navigation banners in the navigation presentation mode. This stage also shows that the user now is scrolling back to review the previous banners and instructions (e.g., by contacting the touch-sensitive display screen of the device with one or more fingers and dragging the finger(s) to the right on the display screen to scroll the display area to the right or back).

The second, third, and fourth stages 610, 615, and 620 show similar user interfaces as the ones shown in the fourth, third, and second stages 520, 515, and 510 of FIG. 5, respectively. However, in these three stages, instead of swiping the screen to the left to see the next navigation banner, the user swipes the display screen to the right in order to see the prior navigation banner. In addition, the third stage 615 shows the current position of the device through the current position indicator 630 that is drawn on a walking portion of the map between the first and second legs of the transit route.

This is because the map application of some embodiments iteratively monitors the current position of the device along the transit route. In some such embodiments, when the application determines that the currently displayed navigation banner is for a transit leg that is associated with the current location of the device, the application automatically, and without user intervention, displays a current position indicator on the map (in the map view display area) that represents the current position of the device (user).

In some embodiments, when the user stops scrolling through the navigation banners during a navigation presentation, the map application automatically scrolls back (or forward) the display screens (i.e., the navigation banner and map view screens) to display the current navigation banner and map view when the application determines the current location of the device along a particular leg of the transit route that is not currently displayed on the device. In other words, the application auto steps to the current transit leg of the transit route and displays the pair of navigation banner and maneuver map view that is associated with the current location of the device when a number of conditions are met. Some of these conditions in some embodiments are, identifying a certain inactivity period, during which, the user has not interacted with the navigation banners, determining that there is enough reception to identify the current location of the device, and identifying that the currently displayed pair of navigation banner and map view is not associated with the current position of the device.

Figure 7:
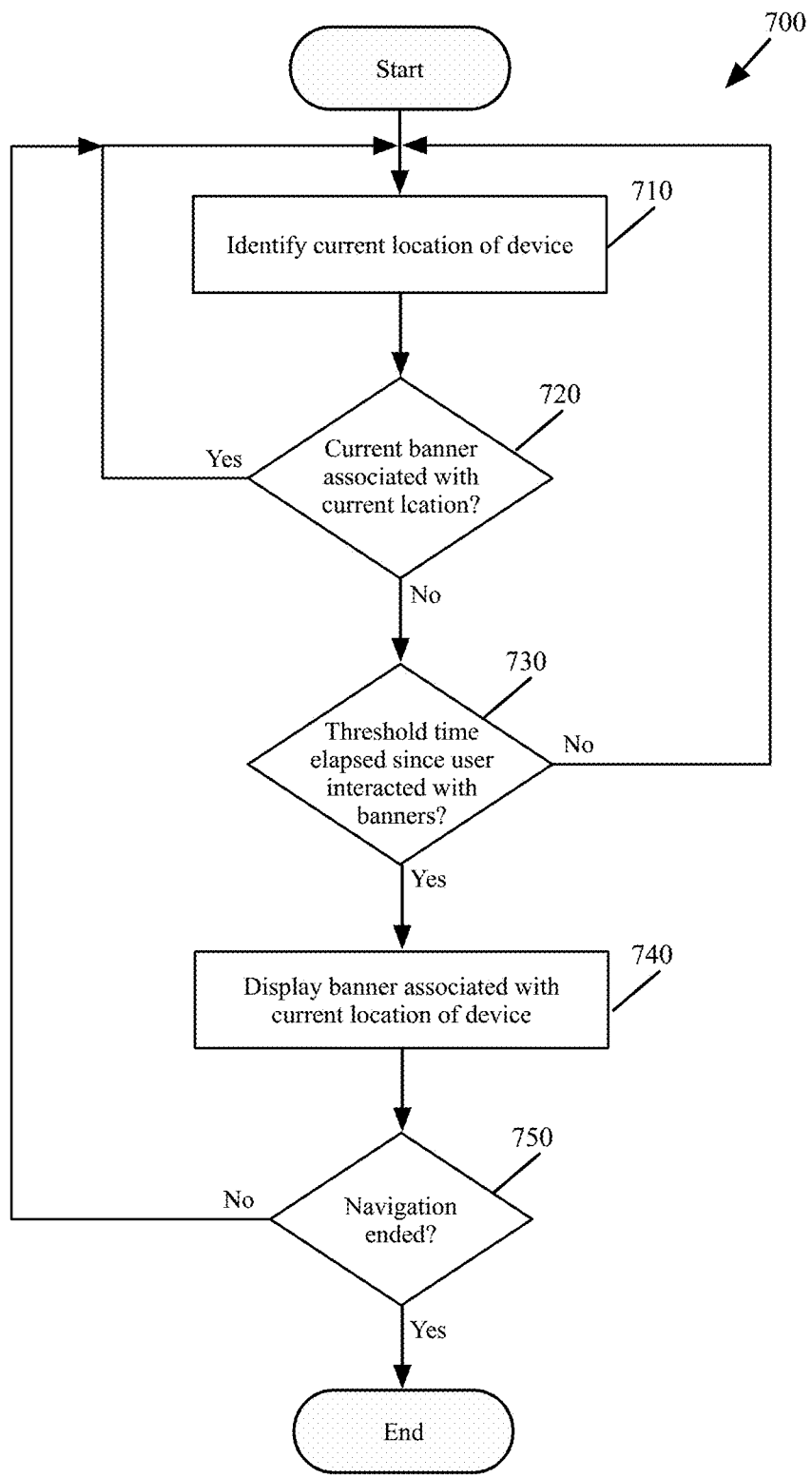
FIG. 7 conceptually illustrates a process that the map application of some embodiments performs to automatically display a pair of navigation banner and map view that is associated with the current location of the device.

FIG. 7 conceptually illustrates a process 700 that the map application of some embodiments performs to automatically display a pair of navigation banner and map view that is associated with the current location of the device. Specifically, the map application changes the currently displayed navigation banner and map view to a navigation banner and map view that are associated with the current leg of the transit route (e.g., by scrolling back or forward the intervening navigation banners and map views) without any user intervention. The current leg of a transit route in some embodiments is a portion of the transit route that covers the current location of the device on the geographical area displayed in the map view (i.e., the location of the device can be displayed on a map view that is associated with the current transit leg).

The process 700 is initiated by identifying (at 710) the current location of the device. The map application of some embodiments identifies the current location of the device using the coordinates (e.g., longitudinal, altitudinal, and latitudinal coordinates) in the Global Positioning System (GPS) signal that the device receives at the location of the device. Alternatively or conjunctively, the map application of some embodiments uses other means (e.g., cell tower triangulation) to compute the current location.

The process then determines (at 720) whether the currently displayed navigation banner is associated with the identified location. As described above and below, each navigation banner of some embodiments provides a navigation instruction that corresponds to a transit leg of the transit route. In order to determine whether the currently displayed navigation banner is associated with the identified location, the process of some embodiments determines whether the identified location is associated with the transit leg (e.g., along the transit leg), for which the navigation banner provides the navigation instruction. When the process determines that the currently displayed navigation banner is associated with the identified location, the process returns to operation 710 and iteratively tracks the current position of the device.

On the other hand, if the process determines that the currently displayed navigation banner is not associated with the identified location, the process determines (at 730) whether a threshold time has elapsed since the user last interacted with the navigation presentation. That is, the process determines whether the user has stopped scrolling the navigation banners for a certain period of time. When the process determines that the threshold time (e.g. thirty seconds, one minute, etc.) has not elapsed since the user last interacted with the navigation presentation, the process returns to operation 710 to iteratively track the current position of the device.

On the other hand, if the process determines that the threshold time has elapsed since the last interaction of the user with the navigation presentation (i.e., the currently displayed banner has been on the screen for more than a particular time period), the process displays (at 740) a pair of navigation banner and map view that is associated with the current location of the device. In order to do so, some embodiments scroll back or forward all the intervening banners and map views to display the current navigation banner and map view that is associated with the current location. Some other embodiments merely replace the last displayed navigation banner and map view with the current navigation banner and map view in their corresponding display screens. The process then ends.

Some embodiments perform variations of the process 700. The specific operations of the process 700 may not be performed in the exact order shown and described. For example, the process of some embodiments instead of determining whether the current location is associated with the currently displayed banner, first determines whether a threshold time has elapsed since user last interacted with the device, and then makes the determination about the association of the currently displayed banner with the current position of the device. Additionally, the specific operations may not be performed in one continuous series of operations, and different specific operations may be performed in different embodiments.

As described above, some embodiments provide a separate navigation instruction (in a separate navigation banner) for each next action (or transit maneuver) that the user of the device should take during a navigation presentation. For instance, when a user has to walk to the transit station A, board a transit vehicle at transit station A, exit at transit station B, and then walk to the destination, some embodiments provide a first navigation banner (and its associated map view) with instructions for walking to transit station A, a second navigation banner (and its associated map view) for boarding the transit vehicle, a third navigation banner (and its associated map view) for exiting the transit vehicle at transit station B, and a fourth navigation banner (and its associated map view) for walking to the destination. Some embodiments also provide a navigation banner between the second and third banners (i.e., entering and exiting the transit vehicle) that provides additional instructions while the device is on board (i.e., the user is travelling on the transit vehicle).

The map application of some embodiments automatically scrolls the navigation banner display area and the map view display area (auto steps) to display the next step of the navigation based on a set of heuristics. The primary heuristic in determining whether to auto step or not in some embodiments is the distance between the two steps. However, when the distance is less than a threshold amount between the two steps, some embodiments consider other heuristics to determine whether to auto step or not.

Some embodiments provide a separate navigation banner that includes navigation instructions for entering a transit station (e.g., an enter-station navigation banner). Some such embodiments display the enter-station navigation banner when the device is within a threshold distance (e.g., 100 meters) from any of the transit stations of the transit route. Some other embodiments do not provide a separate navigation banner for transit stations and integrate the instructions of such into the navigation instruction that is provided for a walking leg before reaching the transit station, or into the navigation instruction that is provided to board the transit vehicle.

Once the map application of some embodiments determines (e.g., through a mapping service) that the device (user) is at a transit station, the application provides instructions that instruct the user to board the transit vehicle. Some embodiments determine that the device is at the transit station when the device is located on the same map polygon that includes the transit station. Some other embodiments determine that the user is at the station when the device is within a threshold distance of the station. Some embodiments require additional conditions to be met to determine that the device is at the transit station.

For instance some embodiments require that the device be on a travelling mode (e.g., the user was travelling on another transit vehicle) before the tracked location of the device reaches a particular spot within a threshold distance of the transit station. Some such embodiments do not require the device to be in a travelling mode once the device reaches the particular spot. This is particularly helpful when the location of the device cannot be determined before reaching the transit station (e.g., the user is travelling on an underground subway train before reaching the bus stop and changing the transit vehicles). Some embodiments can determine whether a device is on a travelling mode or not by analyzing the motion data the map application receives through different motion sensors of the device.

For transit stations for which a separate map polygon is not provided (e.g., for a bus stop), some embodiments only use the threshold distance to the transit station. Some embodiments first determine whether a station polygon is provided. These embodiments use the polygon method when a polygon exists for the station and use the distance method when there is no transit station polygon available. Yet some other embodiments use a combination of both methods (i.e., being in the same map polygon and within the threshold distance) in order to determine that the device is at the transit station even when a transit station polygon exists.

When the map application of some embodiments determines that the device is outside a threshold distance from the current transit station and between the current transit station and the next transit station to exit the transit vehicle, the map application auto steps forward and shows the next navigation banner that includes the next transit station to exit the transit vehicle. The map application of some other embodiments does not auto step until the device reaches a threshold distance to the last transit station of the transit leg and when the application determines that the device is within the threshold distance (or on the same map polygon that the exit transit station is, or a combination of both), the application auto steps and shows the next navigation banner that includes instructions for exiting the transit vehicle at the transit station.

Some embodiments auto steps to an intermediate navigation banner that is after the first banner that instructs the user to board the transit vehicle and before the next banner that instructs the user to exit the transit vehicle. The intermediate navigation banner of these embodiments includes a navigation instruction that instructs other helpful instructions for guiding the user (e.g., instructing the user to stay on the transit vehicle, showing the remaining distance to the last transit station of the transit leg, showing the remaining number of stops before reaching the last transit station of the transit leg, etc.).

Figure 8:
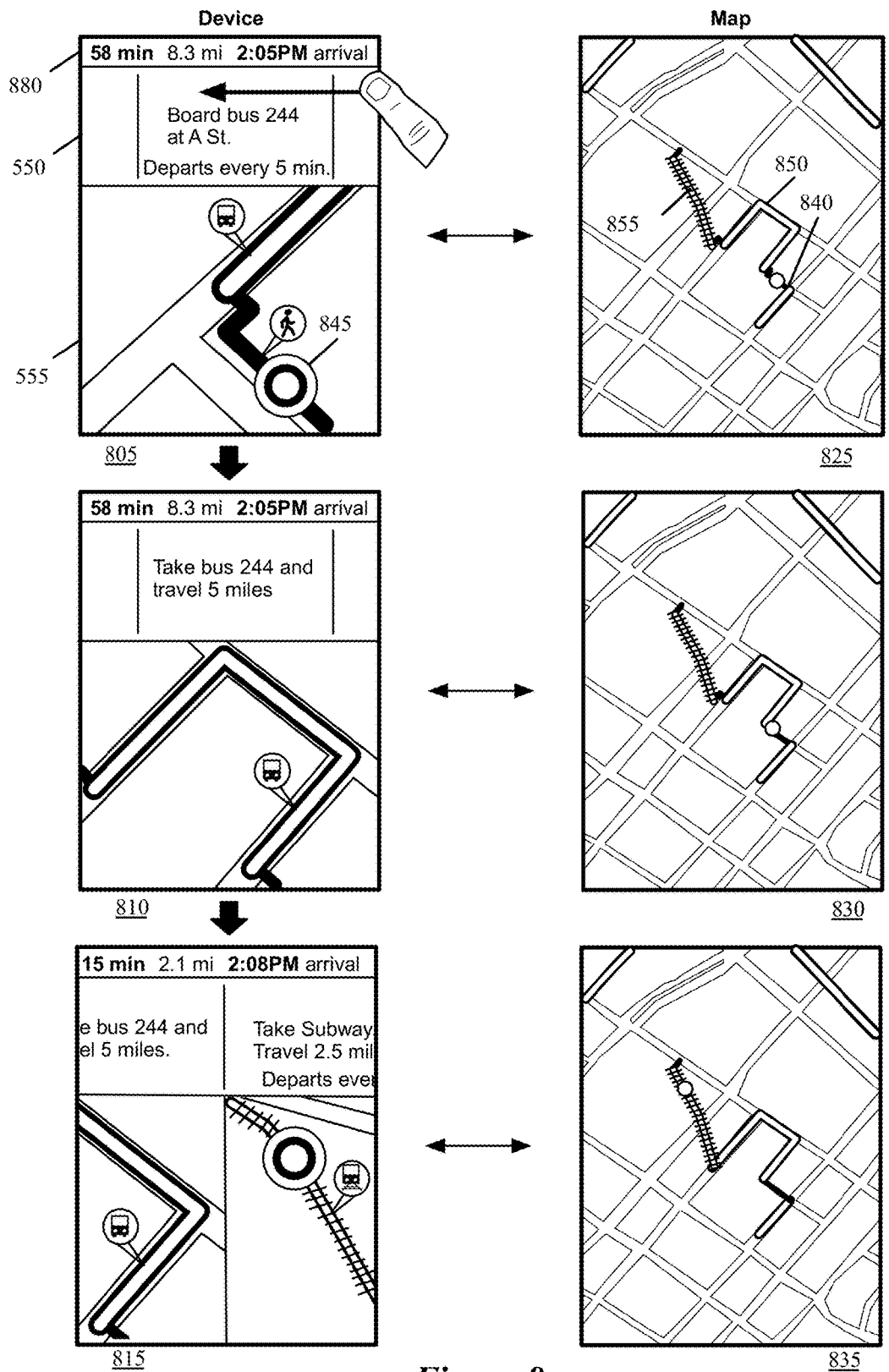
FIG. 8 illustrates a map application of some embodiments automatically displaying a navigation banner that is associated with the current position of the device.

FIG. 8 illustrates a map application of some embodiments automatically displaying a navigation banner that is associated with the current position of the device. This figure is described in terms of three different stages 805-815 of the map application UI and three top-down views 825-835 of the map that illustrate the position of the device in three different legs of a transit route that correspond to the three stages 805-815, respectively.

As stated above, the map application of some embodiments iteratively monitors the current position of the device along the transit route. In some such embodiments, when the application determines that the currently displayed navigation banner is for a transit leg that is not associated with the current location of the device, the application automatically, and without user intervention, scrolls back (or forward) the navigation banner display area and the map view display area to display the navigation banner and map view for a transit leg that is associated with the current position of the device. That is, the map application automatically changes the currently displayed banner and map view to a navigation banner and map view that are associated with a portion of the transit route that covers the current location of the device (e.g., by scrolling back or forward the intervening navigation banners and map views). The map application of these embodiments displays the new navigation banner and its corresponding maneuver map view without receiving any user interaction with the device (e.g., a touch gesture, a swipe gesture, etc.).

Before automatically scrolling the navigation banners to display the navigation banner that is associated with the current transit leg, the map application of some embodiments first determines that the application has accurately detected the current location of the device (e.g., by ascertaining that the device has enough reception to accurately determine its current position). Alternatively or conjunctively, the navigation application of some embodiments keeps track of the time since the navigation application displayed the last navigation banner for a transit leg. The application of some such embodiments automatically refreshes the display areas to display the navigation banner of the current transit leg and the corresponding maneuver map view when a defined period of time elapses since the last navigation banner and map view were displayed. Therefore, in some embodiments, in order for the map application to change the current transit leg's navigation banner and its corresponding map view, the application determines that (1) an accurate location of the device is identified, (2) the currently displayed banner is not associated with the current location of the device, and (3) a certain time period has passed since the currently displayed banner has been last shown to the user.

In the first stage 805, the navigation banner display area 550 displays a navigation banner for a walking portion of the transit route that includes navigation instruction for boarding the next bus which departs every 5 minutes. As described above, some embodiments, as in the illustrated example, provide a separate pair of navigation banner and map view for each transit navigation maneuver including a maneuver at the beginning of a transit leg (e.g., boarding a transit vehicle) and at the end of a transit leg (e.g., exiting a transit vehicle). The map view display area 555 also displays a current position of the device through a current position indicator 845 that is moving towards the next bus stop of the transit route.

The corresponding top down view 825 of the first stage 805 shows that the device is currently located at the walking leg 840 of the transit route. The first stage 805 further shows that the user is swiping through the navigation banner in order to see the next navigation banner in the sequence and the maneuver map view that is associated with the next navigation banner. The first stage 805 also shows a trip summary display area 880 that includes additional information about the transit trip (e.g., the total/remaining trip duration, total/remaining trip distance, etc.). As shown in this stage, the trip summary display area 880 shows that the total trip time is 58 minutes for this transit trip and the total distance to the destination is 8.3 miles.

The second stage 810 shows that the navigation banner display area 550 displays the next navigation banner that is associated with the next transit leg of the trip (i.e., the bus leg 850). The corresponding top down view 830 of the second stage 810 shows that the device is still on the walking leg 840 of the transit route, however, it has moved further towards the second leg 850. For instance, the user of the device is walking towards the next bus stop while the user is swiping through the different navigation banners to browse the navigation route. The navigation banner of the second stage 810, as illustrated, includes a navigation instruction for boarding the next bus of the bus line 244.

The third stage 815 shows that the navigation banner display area 550 and the map view display area 555 are scrolling forward to display the next navigation banner and map view even though the user did not interact with the device (e.g., swipe through the displayed banner) in the previous stage. This is because the application has detected that the current location of the device is on a different leg of the transit route. That is, as the corresponding top down view 835 of the third stage 815 shows, the current position of the device is now in the middle of the third and last leg of the transit route (i.e., the transit leg 855), while the navigation banner and map view display screens were still showing the navigation instruction and map view associated with the second leg of the transit trip.

Therefore, the map application, after identifying that the current location of the device is on a portion of the transit route that is different than the currently displayed navigation instruction and map view, automatically scrolls the banner and map view to show the banner and map view that are associated with the current position of the device. In the illustrated example, because the user did not interact with the device for a certain amount of time during which the position of the device changed from the second leg to the third leg, the display areas scroll forward to show the updated information. The third stage also shows that the trip summary display area 880 has also been updated and now shows that the remaining trip time is 15 minutes and the remaining distance to the destination is 2.1 miles.

Although not shown, one of ordinary skill in the art would realize that the displayed banner and map view could similarly scroll backward. For example, if the user swipes through the navigation banners to the last navigation banner for the last transit leg, when the position of the device stays on one of the earlier transit legs of the trip for a certain time, the application of some embodiments scrolls the screens back to display the information related to the current position of the device in the navigation banner and the map view.

Some embodiments allow the user to modify the transit route during the navigation presentation. In some embodiments, the user can replace one or more transit legs of the transit route with one or more transit legs that were not part of the originally presented transit route. That is, in some embodiments, each transit leg under certain circumstances (described below) may be replaced by another route that includes one or more transit legs. In some embodiments, the user can modify the route while the user steps through the different navigation banners of the transit route. In some embodiments, the user may modify the route while a navigation list view of the route is presented to the user.

Figure 9:
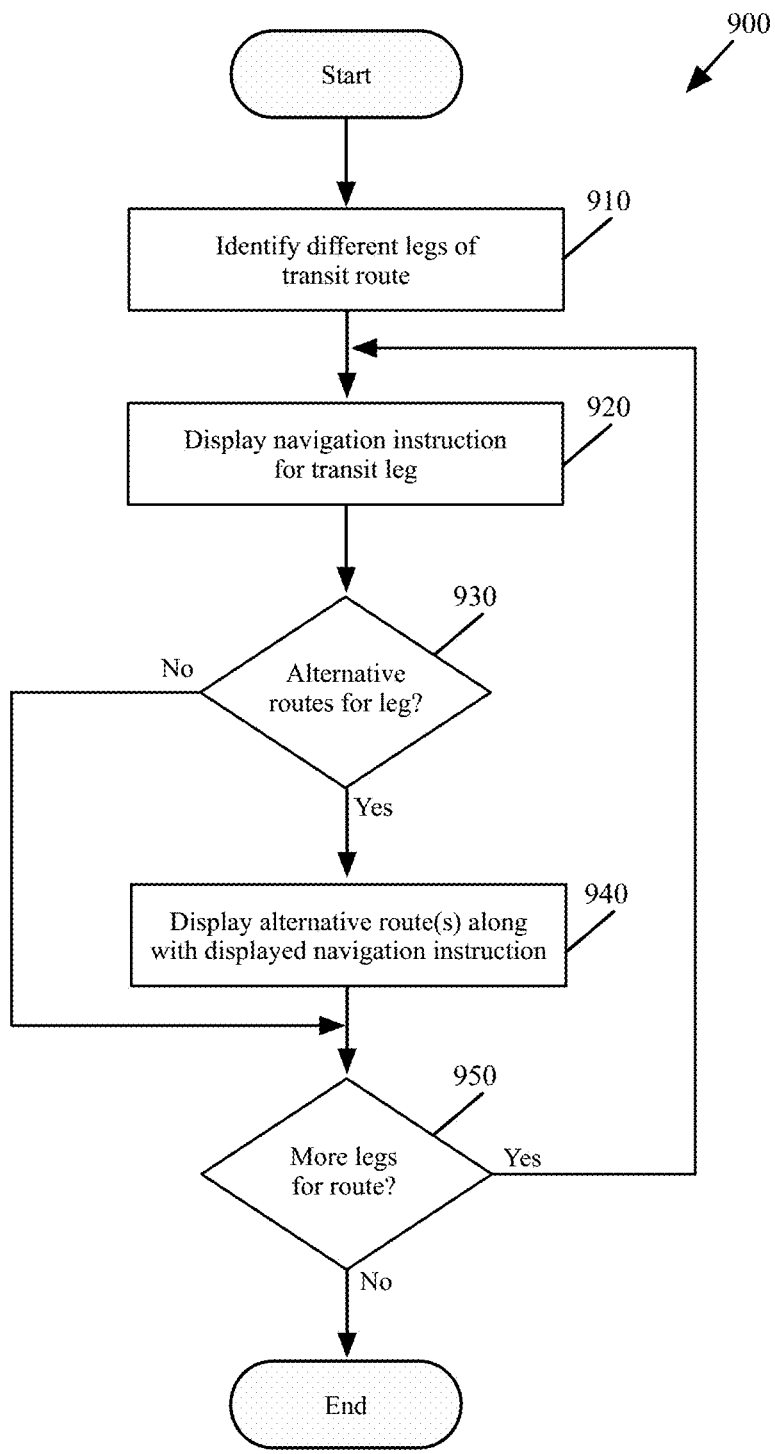
FIG. 9 conceptually illustrates a process that some embodiments perform to identify and display one or more alternative routes for a transit leg of a transit route.

FIG. 9 conceptually illustrates a process 900 that some embodiments perform to identify and display alternative routes for a transit leg of a transit trip. The mapping service of some embodiments which provides transit data to the map application performs this process while in some other embodiments the process is performed by the map application that runs on the device. Some embodiments perform this process to display the navigation instructions of the transit route in a navigation list view similar to the navigation list view described above by reference to FIG. 3.

The process 900 begins by identifying (at 910) the different legs of a transit route. As described above, a transit route of some embodiments includes several legs each of which is either serviced by a different transit vehicle of a different line, or a navigable pedestrian route, which includes a walking distance that is more than a threshold distance. The process then displays (at 920) a first navigation instruction for the first transit leg of the transit route (e.g., in a transit navigation list view).

The process then determines (at 930) whether there is any alternative route for the displayed leg. The process of some embodiments makes such a determination by determining whether the displayed transit leg is replaceable by a second route (including one or more transit legs) that runs parallel with the displayed transit leg (i.e., from the same starting station to the same ending station). In some other embodiments a transit leg is replaceable by a second route when the second route (that includes one or more transit legs itself) and the transit leg have at least two common transit stations or two transit stations that are within a short distance of each other (e.g., within a threshold distance of each other).

When the process determines that there is no alternative route for the displayed leg, the process proceeds to operation 950 which is described below. On the other hand, when the process determines that there are one or more alternative routes for the displayed leg, the process displays (at 940) the alternative routes to the user as selectable items along with the navigation instruction for the transit leg. The user can then select any of the alternative routes to replace the currently displayed leg with the alternative routes. In some embodiments, the one or more other transit vehicles of an alternative route can be of the same type as the transit vehicle that travels the transit leg, or they can be of different types (e.g., the transit leg is traveled by a bus, while the second route is traveled by one or more subway trains).

The process then determines (at 950) whether there are more legs in the transit route to process. When the process determines that additional legs are left in the transit route, the process returns to 920 to display the navigation instruction for the next leg of the transit route and any possible alternative routes for the next leg in the same manner that was described above. On the other hand, when the process determines that the last transit leg of the transit route has been processed, the process ends.

Some embodiments perform variations of the process 900. The specific operations of the process 900 may not be performed in the exact order shown and described. Additionally, the specific operations may not be performed in one continuous series of operations, and different specific operations may be performed in different embodiments. For example, some embodiments perform similar operations to identify and display navigation banners and map views in a navigation presentation. The process of some such embodiments displays the next legs and navigation instructions, however, upon receiving a user interaction with the displayed screen (e.g., a user scrolls through a navigation banner to review the next instruction in the next navigation banner, as described above).

Figure 10:
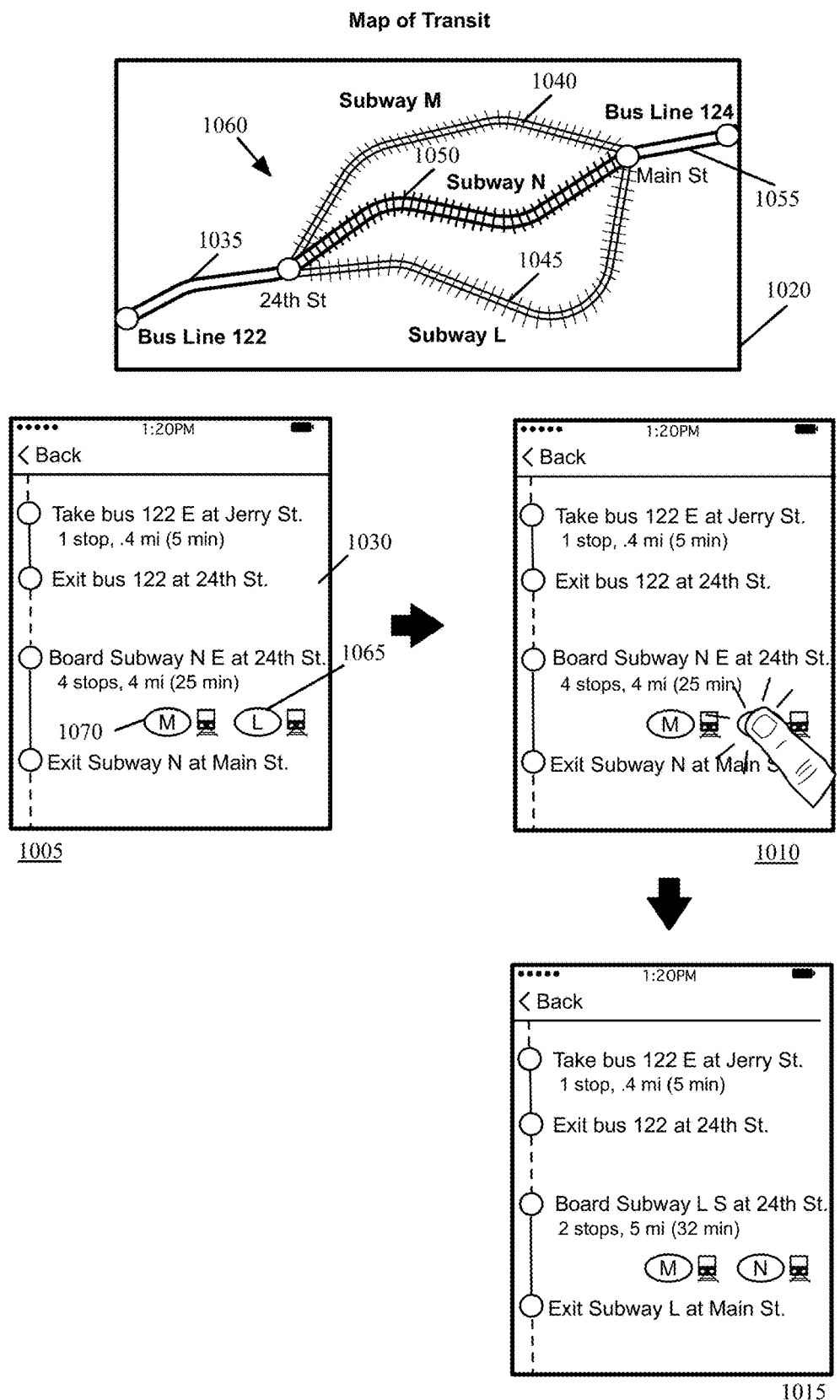
FIG. 10 illustrates an example of modifying a selected transit route in a navigation list view.

FIG. 10 illustrates an example of modifying a selected transit route in a navigation list view. This figure shows through three operational stages 1005-1015 and a transit map presentation 1020, how a user can replace a particular leg of a transit route with a different transit leg while the user views a navigation list view of the transit route. As discussed above, when a user selects a route summary presentation (e.g., presented in response to a request for transit route), the map application of some embodiments provides a list view of the selected transit route which provides a list of detailed instructions on how to navigate the transit route.

The transit map presentation 1020 displays representations of different routes of different transit lines in a particular geographical area. Specifically, the transit map shows two bus line representations 1035 and 1055 for the bus lines 122 and 124, respectively. The buses of these two lines travel along the two legs of a portion of a transit route 1060 that is highlighted on the map presentation (e.g., a transit route selected by the user). The transit map also shows one subway line representation 1050 for the subway line N which is another leg of the transit route 1060. The transit map further includes two other subway line representations 1040 and 1045 for the subway lines M and L. The subway lines M and L, however, are not a part of the transit route 1060, but run parallel with the leg 1050 (subway line N) of the transit route 1060.

In the first stage 1005, a user is presented with a navigation list view (e.g., after the user selected a route summary associated with the list view) 1030. The list view includes all the navigation instructions required to navigate the transit route 1060. However, the first stage 1005 only shows the instructions of the list view that are related to the portion of the map that is displayed in the transit map presentation 1020. The displayed portion of the list view at this stage includes instructions for taking a bus of line 122 heading east at Jerry Street, and after passing one bus stop and traveling for about 0.4 miles, exiting the bus 122 at the 24$^{th}$ Street. The walking instructions between the legs are not displayed for simplicity of description. The list view also includes an instruction that instructs the user to board subway N heading east at the 24$^{th}$ Street. However, under the same instruction, the list view includes two subway representations 1065 and 1070 for the subway lines L and M, respectively.

In some embodiments, the map application determines whether any of the transit legs of a selected transit route is replaceable by a second different route that is traveled by one or more other transit vehicles. In some embodiments a transit leg is replaceable by a second route when the second route runs parallel with the identified transit leg (i.e., from the same starting station to the same ending station). In some other embodiments a transit leg is replaceable by a second route when the second route and the transit leg have at least two common transit stations or two transit stations that are within a short distance of each other (e.g., within a threshold distance of each other).

In some embodiments, the one or more other transit vehicles of the second route are of the same type as the transit vehicle that travels the transit leg (i.e. the transit vehicles are from the same transit system), or the transit vehicles are of different types (e.g., the transit leg is traveled by a bus, while the second route is traveled by one or more subway trains and buses). When the map application of some embodiments determines that a transit leg of a transit route can be replaced with other routes, the map application displays the other routes to the user along with the same navigation instruction that is associated with the transit leg. That is, the navigation application displays the navigation instruction for the transit leg (e.g., in the list view, in the navigation banner, etc.) and provides the other identified routes as selectable UI items for the user to be able to modify the selected transit route.

In the illustrated example, the transit leg 1050 has the same starting and ending stations as the routes 1040 and 1045 at the 24$^{th}$ Street and Main Street, as displayed in the transit map presentation 1020. As such, the map application has determined that the transit leg 1050 can be replaced by these two subway routes and displayed them under the same instruction that is provided for boarding the subway train of line N. The two subway routes 1040 and 1045 are presented with two selectable subway representations 1070 and 1065.

Although in the illustrated example, each substitute route is displayed separately as a selectable UI item, some other embodiments provide a single indicator that other routes are available, and upon selection of the indicator, a new display area provides all other routes that can replace the transit leg along with various transit information about the routes. For example, when other routes are available, the map application of some such embodiments provides a new display area that lists these routes, and for each route in the list, the application provides the travel distance of the route, the number of transit stations that will be passed, the approximate time of travel, the difference in travel distance between the route and the transit leg, etc.

The second stage 1010 shows that the user selects the subway route 1065 (e.g., by tapping on the route representation). The third stage 1015 shows that as a result of selecting the new subway route, the list view now includes new instructions for boarding the subway train of line L (instead of subway train of line N that was shown originally) along with transit information of this subway line. Although in the illustrated example each one of the substitute routes includes only one subway train of one line, as discussed above, each substitute route can include multiple subway trains of different lines in some embodiments. Conversely, each one of the illustrated substitute routes can be traveled by a transit vehicle of a different type (e.g., a bus) or by several different transit vehicles of different lines and different types. For example, the presented transit leg might be a subway line with an alternative route that includes both a bus line and a different subway line.

Figure 11:
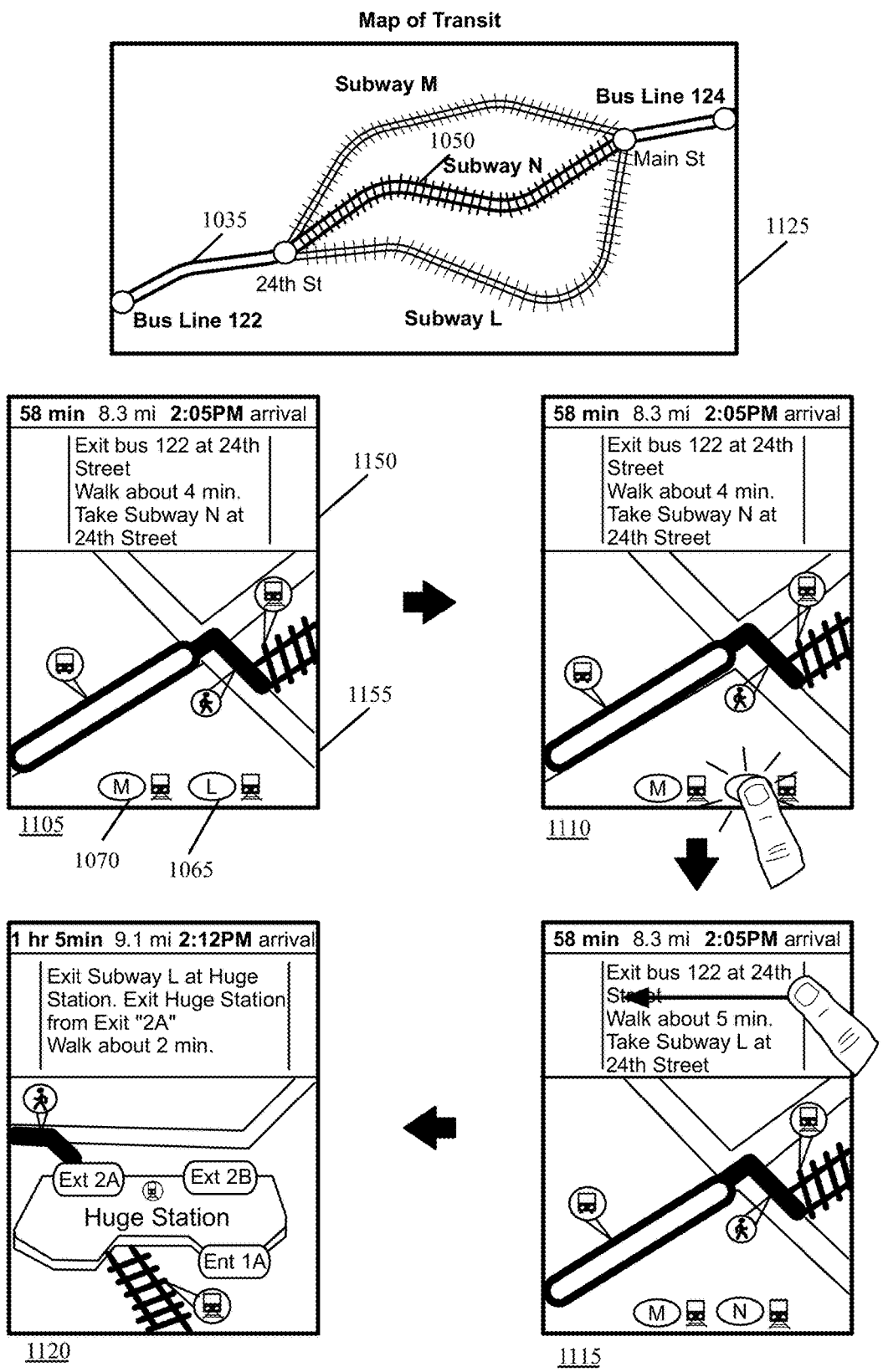
FIG. 11 illustrates another example of modifying a selected transit route in a navigation presentation.

FIG. 11 illustrates another example of modifying a selected transit route in a navigation presentation. This figure shows through four operational stages 1105-1120 and a transit map presentation 1125, how a user can replace a particular leg of a transit route with a different route while the user steps through the navigation banners of a navigation presentation. As described above, when a user selects the Start control to start a turn-by-turn transit navigation presentation, the map application provides a sequence of navigation banners and their corresponding map views of the route to the user. The user can then step (scroll) through the sequence of the banners and view different instructions (e.g., pictorial and text instructions) about each leg of the transit trip.

The transit map presentation 1125 displays the same representations of different routes of different transit lines that were displayed in the transit map presentation 1020 of FIG. 10. The first stage 1105 shows a navigation banner in the banner display area 1150, which includes navigation instructions for the bus leg 1035 of the transit route. The maneuver map view display area 1155 displays the transit leg of the route for which the navigation instructions are provided. Specifically, the map view includes the last portion of the bus leg and the beginning of the subway leg. This map view further includes two other subway representations 1065 and 1075 for the other subway trains that travel the parallel routes to the transit leg 1050. This is because the map application of some embodiments gives the user the option to choose from the different transit vehicles that travel towards the same destination but via different routes.

As described in the example illustrated in the previous figure, the other options for the other routes can be presented to the user differently in different embodiments. That is, although each substitute route is displayed separately as a selectable UI item in this example, some embodiments provide a single selectable UI item in the map view area that indicates to the user that other routes are available for this particular transit leg. Upon selection of this UI item, a new display area opens up which provides all other routes in a list format and for each route in the list, different transit information about the route is provided by these embodiments.

The second stage 1110 shows that the user selects the subway route 1065 (e.g., by tapping on the route representation). The third stage 1115 shows that as a result of selecting the new subway route, the navigation banner now includes new instructions for boarding the subway train of line L (instead of subway train of line N that was shown originally) along with transit information of this subway line. The third stage also shows that the user swipes through the navigation banner to view the next step's navigation banner and map view of the transit route. The fourth stage 1120 then shows a navigation banner that instructs the user on where to get off the subway train L and how to Exit the subway station to get to the next bus stop of the transit route.

All the above concepts and features described for a map application are equally applicable to different types of electronic devices with different types and sizes of display screens. However, some of the user interfaces are presented differently for different devices. For instance, the illustrated example in FIG. 5 shows a transit navigation presentation that some embodiments provide for a particular type of electronic device with a particular size of display screen (e.g., an iPhone). Some embodiments provide different navigation presentations on different types of electronic devices.

For example some embodiments provide a navigation presentation that although operates in the same above-described manner, provides a different type of user interface and navigation presentation on a different type of electronic device (e.g., an Apple Watch). Because of the size limitation of the display screen and/or display area of some electronic devices, the map application of some embodiments is not able to display all the map/navigation information that the application would have shown in a device with a bigger display screen at once.

Some embodiments provide means that compensate for this type of limitation. For example, the transit navigation presentation provided by some embodiments does not provide a pair of navigation banner and map view together (as shown and described in the above examples) for each transit navigation instruction. Instead, the transit navigation presentation provides a navigation banner for each transit navigation instruction in one screen, and upon selection of the banner (e.g., by tapping on the banner or display screen), the navigation presentation provides a map view that is associated with the displayed navigation banner. The user can then switch back to view the navigation instruction by selecting a back control (e.g., by tapping on a back control) or by swiping the display screen (e.g., touch the display screen with one or more fingers and drag the finger(s) to the right).

Figure 12:
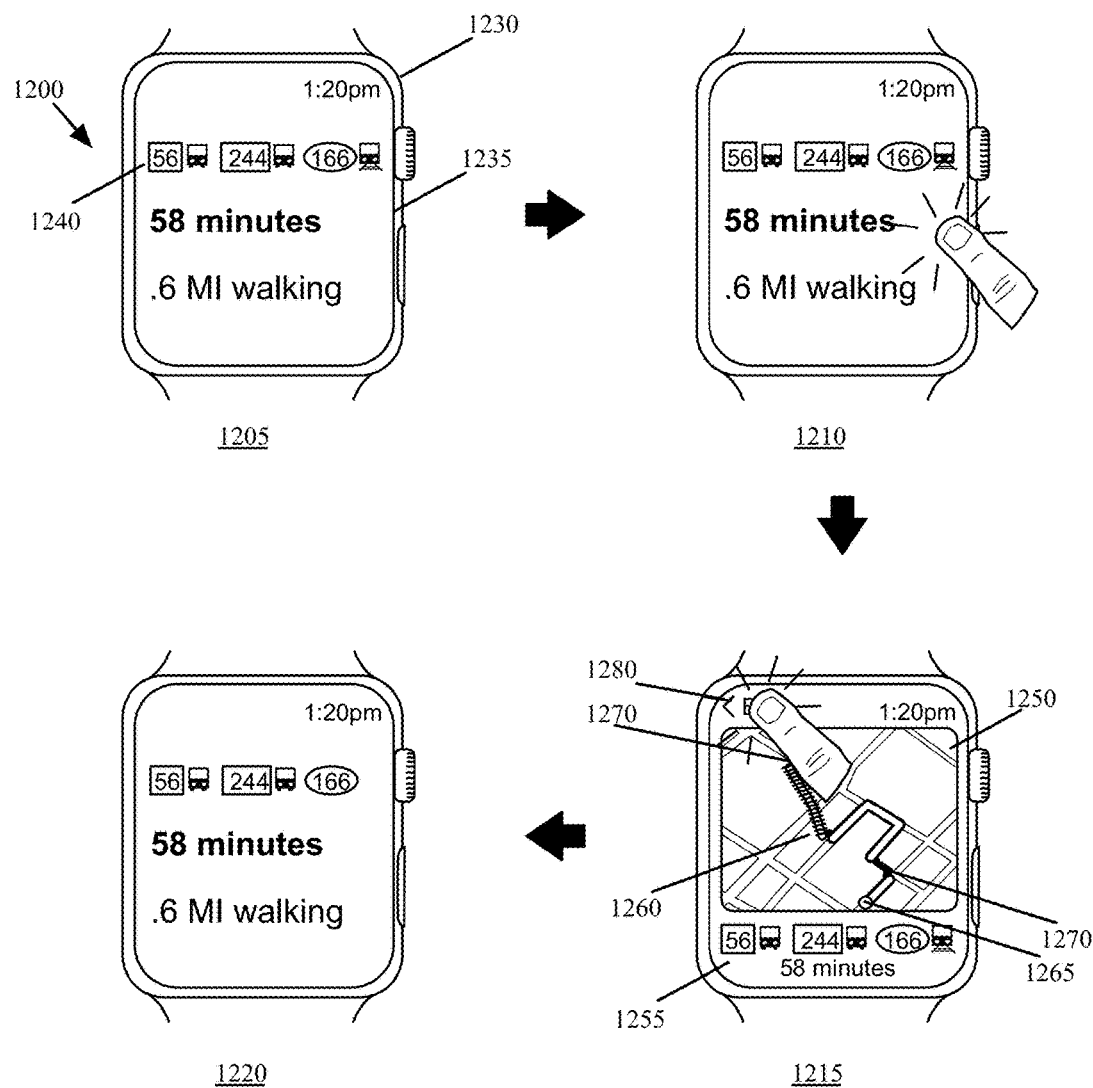
FIG. 12 illustrates initiation of a transit navigation presentation on a different type of electronic device.

FIG. 12 illustrates initiation of a transit navigation presentation on a different type of electronic device (e.g., an Apple Watch). Specifically, this figure shows, through four operational stages 1205-1220, how a user can view a transit navigation presentation. Some embodiments require a connection (e.g., wireless connection, a short-range wireless connection such as Bluetooth connection, etc.) between the electronic device 1230 and a separate device on which the map application operates (e.g., an iPhone). Some other embodiments do not require such a connection and the electronic device 1230 can exchange the transit and routing data as well as other map and navigation data with a mapping service directly.

The first stage 1205 shows the electronic device 1230 with a display area 1235 that is displaying a UI 1200 of the map application. As stated above, the map application may run on another electronic device that is connected to the device 1230 (e.g., through Bluetooth) or on the same electronic device. A user has requested to start navigating a transit route between two particular locations (e.g., current location of the user and a destination location) and in response to the request, the display area is showing a route summary presentation 1240 of a transit route between the two locations. In some embodiments, the user requests for the transit route through a separate device and selects a start navigation control similar to the Start control 184 of FIG. 1 in order to reach the illustrated stage 1205. In some other embodiments the user can request for the transit route and start navigating the requested transit route directly through the electronic device 1230, with or without a connection to a separate device.

The route summary presentation 1240, as shown, includes two bus representations of different lines 56 and 244 that travel the first and second legs of the transit route and a subway train representation of the line 166 that travels the last leg of the transit route. The display area 1235 also shows that the total transit trip time is 58 minutes which includes a total walking distance of 0.6 miles. As described above some embodiments display a walking person representation for the different walking portions of the route in the route summary presentation, while some other embodiments display the walking representation only for walking portions that are more than a threshold distance (e.g., 0.5 miles).

The second stage 1210 shows that the user requests for a corresponding map presentation of the transit route summary. In some embodiments, the user may request for such by selecting any portion of the displayed information. That is, in some such embodiments, when the user taps on any portion of the display area 1235 of the device's display screen, the map application provides a map presentation and transit route that is associated with the displayed route summary presentation. As shown in this stage, the user selects the displayed route summary (e.g., by tapping on the display area 1235 of the screen) in order to view the transit route on a map presentation.

The third stage 1215 shows a map presentation 1250 with a transit route representation 1260 drawn over the map presentation. Specifically, the representation of the transit route includes three different transit legs that are drawn over a map region. In the illustrated example, the first and second transit legs (i.e. the first and second portions of the transit route) are traveled by two buses of different lines and therefore are displayed in a similar format. The third transit leg of the transit route, however, is traveled by a subway train, hence it is shown differently (i.e., as a railway representation on the map). The third stage 1215 also shows a representation 1265 of the current location of the device.

As shown, the device is currently located at the first transit station (i.e., the first bus stop) of the transit route, therefore no walking distance is presented between the current location of the user and the first transit station. Two walking distances 1270, however, are shown on the map presentation. The first walking distance separates the two bus routes from each other while the second walking distance is from the last subway station of the transit route to the desired destination. This stage also shows a route summary presentation area 1255 that displays the route summary which is similar to the route summary 1240 shown in the first stage 1205. Some embodiments, however, do not provide a separate route summary presentation area such as the one displayed in this figure. Some such embodiments only display the corresponding map view upon selection of the route summary presentation.

The third stage also shows that the user selects the back control 1280 (e.g., by tapping on the control) in order to direct the map application to change the display area back to display the route summary presentation. In some embodiments, the user can also swipe back the map view (e.g., by swiping the display screen to the right) in order to switch the display area back to display the route summary and/or navigation instruction. Yet, in some other embodiments a user can view the previous route summary by tapping on the display screen while the display area of the display screen shows the map presentation associated with the route summary.

Therefore, even though the size of the display screen limits the map application to display either the route summary presentation (or a navigation instruction as will be discussed in detail below), or the corresponding map view, a user still can switch between the two by simply tapping on the screen (e.g., tapping on the route summary presentation to switch to its corresponding map view, and tapping on the back control (or swiping back the screen) to switch back to the corresponding route summary presentation and/or a navigation instruction). The fourth stage 1220 shows that as a result of tapping on the back UI control 1280, the map application switches back to displaying the same route summary presentation that was illustrated in the first stage 1205.

Figure 13:
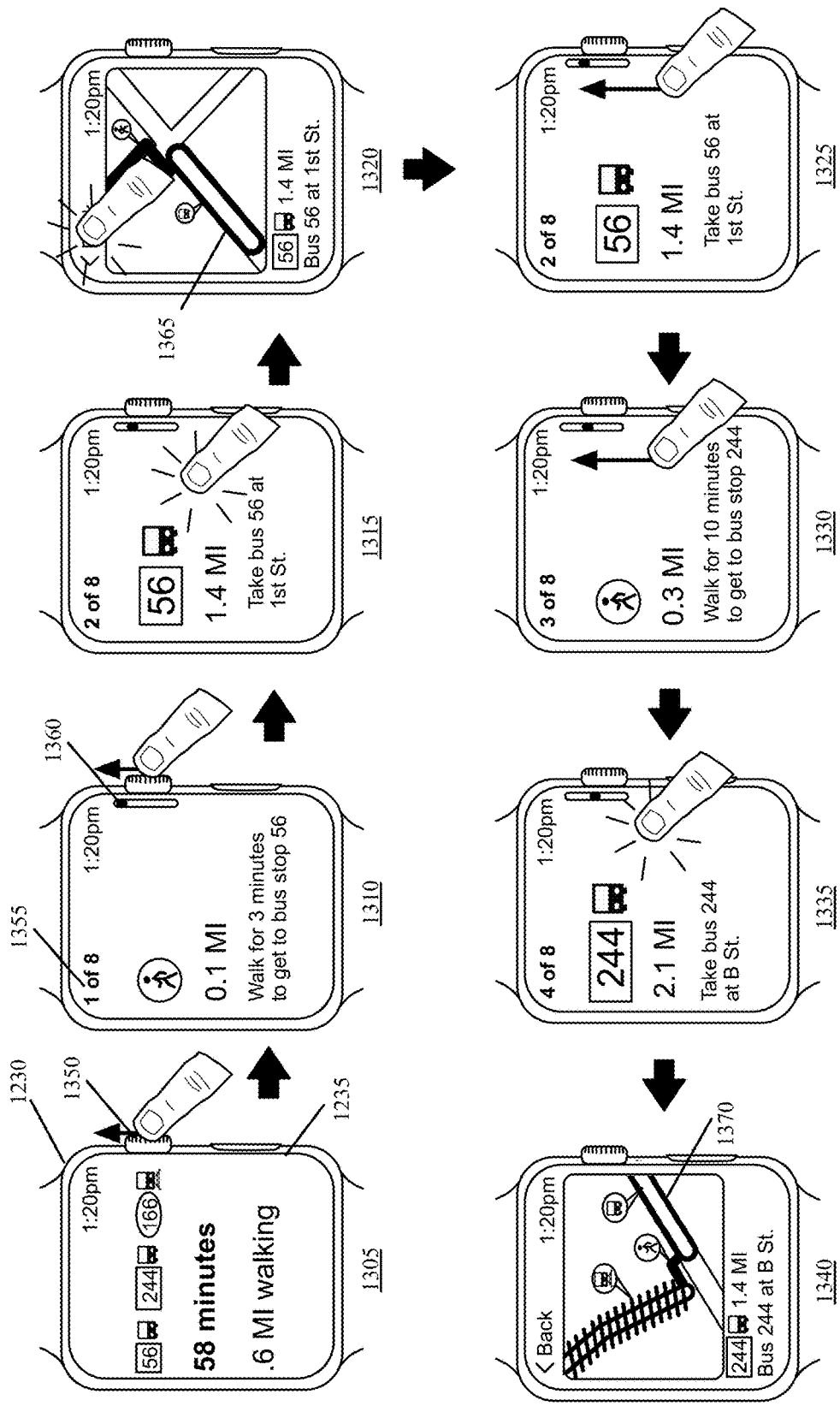
FIG. 13 illustrates a transit navigation presentation and navigating through different navigation banners displayed on an electronic device.

FIG. 13 illustrates a transit navigation presentation and navigating through different navigation banners displayed on an electronic device. Specifically, this figure shows, through eight operational stages 1305-1340, how a user can view a transit route and step through the different transit navigation banners for navigating the transit route. Similar to the last example, some embodiments require a connection (e.g., wireless connection, Bluetooth connection, etc.) between the electronic device 1230 and a separate device on which the map application operates (e.g., an iPhone). Some other embodiments do not require such a connection and the electronic device 1230 can receive the transit and routing data from a mapping service (such as the mapping service describe above) directly.

The first stage 1305 shows that the display area 1235 of the electronic device 1230 displays a UI of the map application that is similar to the UI that was displayed in the first stage of FIG. 12. More specifically, in this stage, a user has already requested for a transit route between the current location of the device and a destination location and in response to the request, the display area is showing a route summary presentation of a transit route between the two locations. The route summary presentation includes two bus representations for two different bus lines and a subway train representation for a subway line. These three transit lines shape the three transit legs of the transit route.

The display area 1235 also shows that the total transit trip time is 58 minutes which includes a total walking distance of 0.6 miles. This stage also shows that the user is turning the crown 1350 of the device, which functions as a small scroll wheel in some embodiments. In other words, in some embodiments, a user may navigate through different display screens of the same or different applications by turning and/or pushing the scroll wheel 1350 instead of swiping and/or tapping on the display screens. In this example, the user turns the scroll wheel 1350 to scroll to the next screen of the navigation presentation. That is, unlike the example shown in the previous figure, the user has chosen to scroll through the navigation presentation instead of tapping on the route summary presentation to view its corresponding transit route on the map region. Some embodiments scroll the displayed screen down when the scroll wheel is turned in one direction and scroll the displayed screen up when the scroll wheel is turned in another (opposite) direction.

Similar to the example illustrated in FIG. 5, the transit navigation presentation in some embodiments includes one or more navigation banners and one or more maneuver map views. In some embodiments, each navigation banner corresponds to one maneuver map view. In some such embodiments each maneuver map view and its associated navigation banner provide pictorial and text instructions that describe a transit navigation maneuver, which typically is associated with a transit leg of the transit route. For example each pair of navigation banner and map view corresponds to a starting point of a transit leg or an ending point of a transit leg. In some embodiments, a pair of navigation banner and map view may also correspond to a walking leg of a transit route, an entire leg of a transit route that is traveled by a transit vehicle, a transit station along the transit route, etc.

As shown in the second through eighth stages 1310-1340, the user of the device can scroll through the navigation (instruction) banners to see successive transit navigation banners that include navigation instructions for the transit maneuvers along the transit route. The second stage 1310 shows the first navigation banner in the navigation presentation after the user scrolled through (by turning the crown 1350) the route summary screen in the first stage. The navigation banner in the second stage includes a navigation instruction on how to start the transit route.

Specifically, the navigation banner includes a walking person representation that shows that the user is required to walk a distance to reach the first transit station of the transit route. The banner also shows the walking distance (0.1 miles) to the first station and instructs the user to walk for 3 minutes to reach the first bus station for the bus line 56, which starts the first leg of the transit route. The second stage also shows that the page counter 1355 shows that the displayed navigation banner is the first one in a sequence of eight navigation banners that provide navigation instructions for the requested transit route. The progress in the navigation presentation (i.e., what portion of the route is navigated so far) is further indicated by the progress indicator 1360. The user, at this stage, also chooses to scroll through the navigation banner to see the next step of the navigation presentation.

The third stage 1315 shows the second navigation banner in the navigation presentation after the user scrolled through (by turning the crown 1350) the first navigation banner in the second stage. As shown, the page counter 1355 shows the page count of 2 out of 8 banners and the progress indicator 1360 also has moved a little down to indicate the level of progress in the navigation presentation. The second navigation banner shows a bus representation for bus line 56 and bus leg distance of 1.4 miles. The second navigation instruction in the navigation banner instructs the user to take bus 56 at the first street. In the third stage the user chooses to view the associated maneuver map view for the displayed navigation banner. In order to do so, the user taps on the display screen of the device.

The fourth stage 1320 shows that after the user taps on the display screen while the display area of the display screen was displaying the second navigation banner, the display screen now shows the associated map view for the selected navigation banner. Specifically, this stage shows the second maneuver map view that is associated with the second navigation banner and the first transit leg. The maneuver map view for the second navigation banner (instruction) includes a bus route representation 1365 for the bus line 56 along with a walking portion after the user exits the bus. This stage also shows that in some embodiments, a separate display area shows a representation of the second navigation banner which includes the bus representation and the related instruction to take the bus at the bottom of the display screen.

In some embodiments the instruction shown here in the map view display area is different than the instruction shown in the corresponding navigation banner. For example, in some embodiments the text instruction is shorter that the text instruction shown in the navigation banner. In some other embodiments, as described above, the map application does not provide a separate display area to display the route summary presentation in the map view. The fourth stage 1320 further shows that the user taps on the back control 1280 to switch back to the associated navigation banner for the map view. As stated above, in some embodiments the user can also switch back the corresponding navigation instruction by swiping back the map view (e.g., swiping the screen to the right).

The fifth stage 1325 shows the same UI of the map application that was shown in the third stage. In this stage, however, the user has decided to view the next step of the navigation. Instead of turning the scroll wheel to scroll to the next navigation banner, however, this stage shows that the user swipes through the second navigation banner in order to see the next banner in the sequence. As described above, in some embodiments a user swipes through the navigation banners by touching (contacting) the touch-sensitive display screen of the device with one or more fingers and dragging the finger(s) up or down on the display screen to scroll the screen down or up, respectively.

The sixth stage 1330 shows that as a result of the user's swipe gesture on the navigation banner, the second navigation banner has scrolled out of the display screen and a third navigation banner that provides navigation instructions for the start of the second leg of the transit route is scrolled in and displayed in the display area of the display screen. The navigation banner in the sixth stage includes a navigation instruction for walking to the next transit station of the route. Specifically, the navigation banner includes a walking person representation that shows that the user is required to walk a distance to reach the second transit station of the transit route.

The navigation banner in the sixth stage 1330 also shows the walking distance (0.3 miles) to the first station and instructs the user to walk for 10 minutes to reach the second bus stop for starting the second leg of the transit route traveled by the bus line 244. The sixth stage also shows that the page counter 1355 shows that the displayed navigation banner is the third one in the sequence of eight navigation banners. The user, at this stage, also scrolls through the navigation banner to see the next step of the navigation presentation.

The seventh stage 1335 shows the fourth navigation banner in the navigation presentation after the user scrolled through (by swiping up the display screen) the third navigation banner in the sixth stage. As shown, the page counter 1355 shows the page count of 4 out of 8 banners now and the progress indicator 1360 also has moved further down (almost in the middle now) to indicate the level of progress in the navigation presentation. The fourth navigation banner shows a bus representation for bus line 244 and bus trip distance of 2.1 miles. The fourth navigation instruction in the navigation banner instructs the user to take the bus 244 at the B street bus stop. In the seventh stage the user chooses to view the associated maneuver map view for the displayed navigation banner. In order to do so, the user taps on the display screen of the device.

After the user taps on the display screen while the display area of the display screen displays the fourth navigation banner, the display screen shows, in the eight stage 1340, the associated map view for the selected navigation banner. Specifically, the fourth stage 1340 shows the fourth maneuver map view that is associated with the fourth navigation banner and the second transit leg. The maneuver map view for the fourth navigation banner (instruction) includes a bus route representation 1370 for the bus line 244 along with a walking portion after the user exits the bus.

The illustrated examples in the FIGS. 12 and 13 are not the only operations of the map application that are applicable to other devices such as an Apple Watch. As stated above, all of the above-described embodiments are equally applicable to other electronic devices such as an Apple Watch. As an example, the feature of automatically stepping through the navigation banners by tracking the current position of the device (i.e., auto stepping), which is described in detail above, is also equally applicable to Apple Watch, although no example figure for this feature is provided.

In some embodiments, when the map application is in the driving navigation mode, the map application continually (and without interruption) operates on the device (e.g., the apple watch) to provide the driving navigation presentation. In some such embodiments even when the device is in the locked mode and/or sleep mode (i.e., the display screen of the device is turned off), the map application actively runs on the device (by one or more processors of the device) in order to maintain the navigation presentation.

In some embodiments, when the map application is in the transit navigation mode, the map application does not continuously operate on the device (e.g., the apple watch). In other words, the map application stops operating on the device when the display screen of the device is turned off (the device is in the sleep mode) even if the map application is in the middle of a navigation presentation or any other operation related to the transit navigation presentation. This is because in a transit route, the probability of the device being used underground (e.g., on a subway leg of the trip) or in other areas that the device cannot be properly tracked is often high. As such, in order to save battery time and other resources of the device, some embodiments interrupt the map application while in transit mode, when these embodiments determine that the device cannot connect to a data network or when the device is in sleep mode. In some other embodiments, the map application is not interrupted in the transit mode and actively operates on the device even if the device's display screen is turned off.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
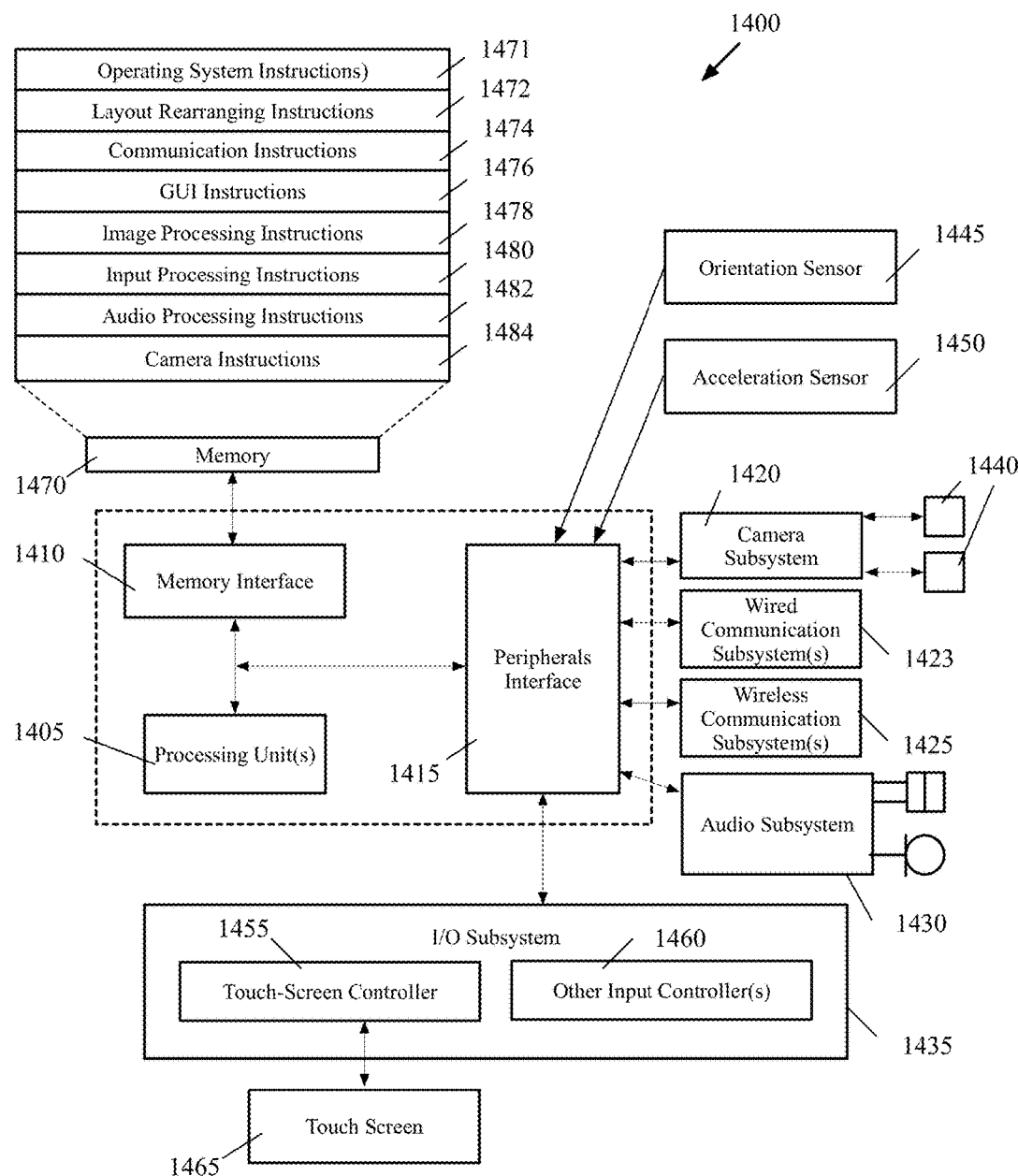
FIG. 14 illustrates an example of an architecture of a mobile computing device of some embodiments.

The applications of some embodiments operate on mobile devices, such as smart phones (e.g., iPhones®) and tablets (e.g., iPads®). FIG. 14 illustrates an example of an architecture 1400 of such a mobile computing device. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wired communication subsystem(s) 1423, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wired communication subsystem 1423 and wireless communication subsystem 1425 serve to facilitate communication functions.

In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions in some embodiments.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1471. The OS 1471 includes instructions for handling basic system services and for performing hardware dependent tasks. The memory 1470 additionally includes layout rearranging instructions 1472 in order for the device 1400 to perform the layout rearranging process of some embodiments. In some embodiments, these instructions 1472 may be a subset of the operating system instructions 1471, or may be part of the instructions for an application.

The memory 1470 also includes communication instructions 1474 to facilitate communicating with one or more additional devices (e.g., for peer-to-peer data sharing, or to connect to a server through the Internet for cloud-based data sharing); graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

Figure 15:
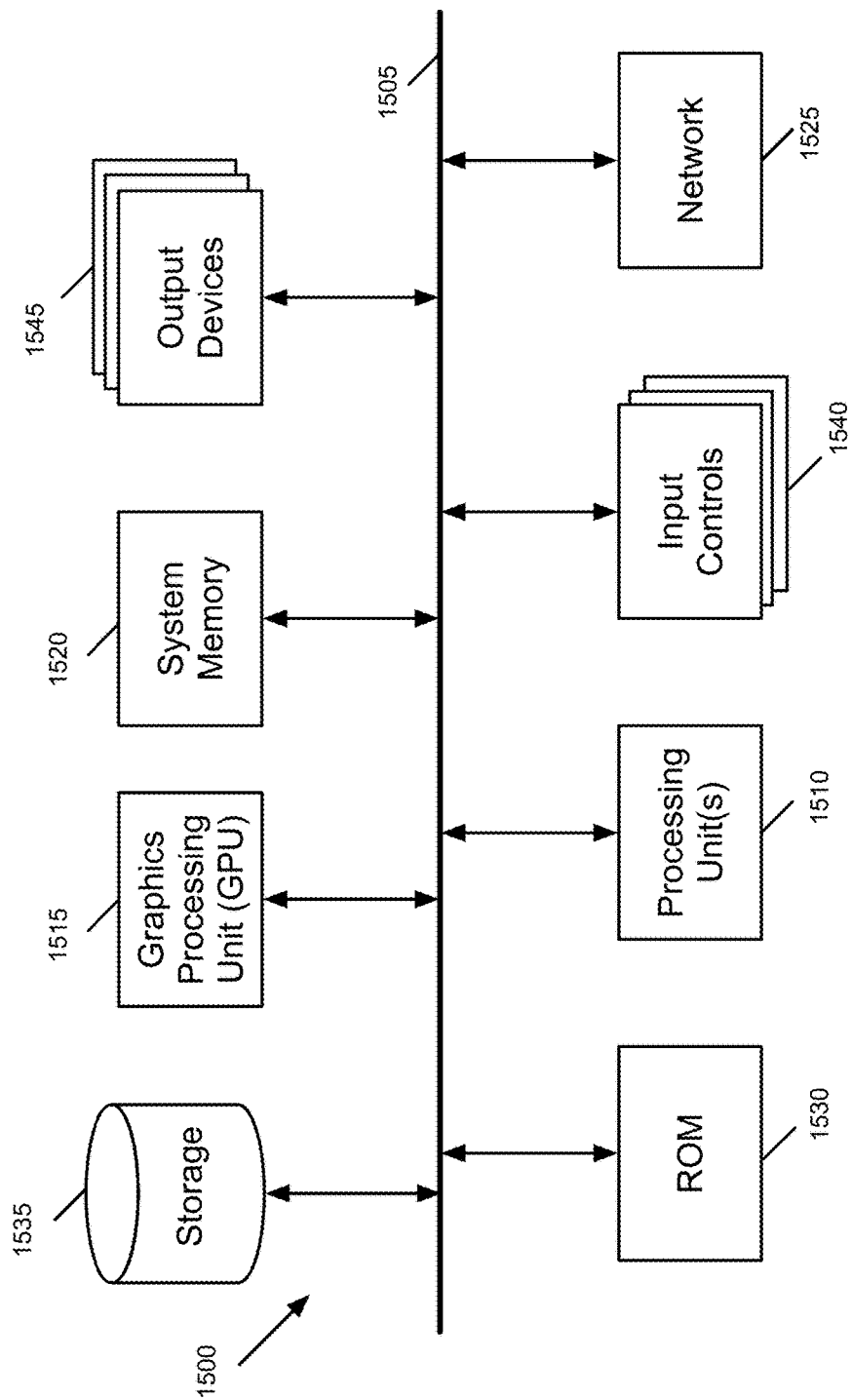
FIG. 15 conceptually illustrates another example of an electronic system with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510. In some embodiments, such functionality can be provided using CoreImage's kernel shading language.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet), or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 7 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

Figure 16:
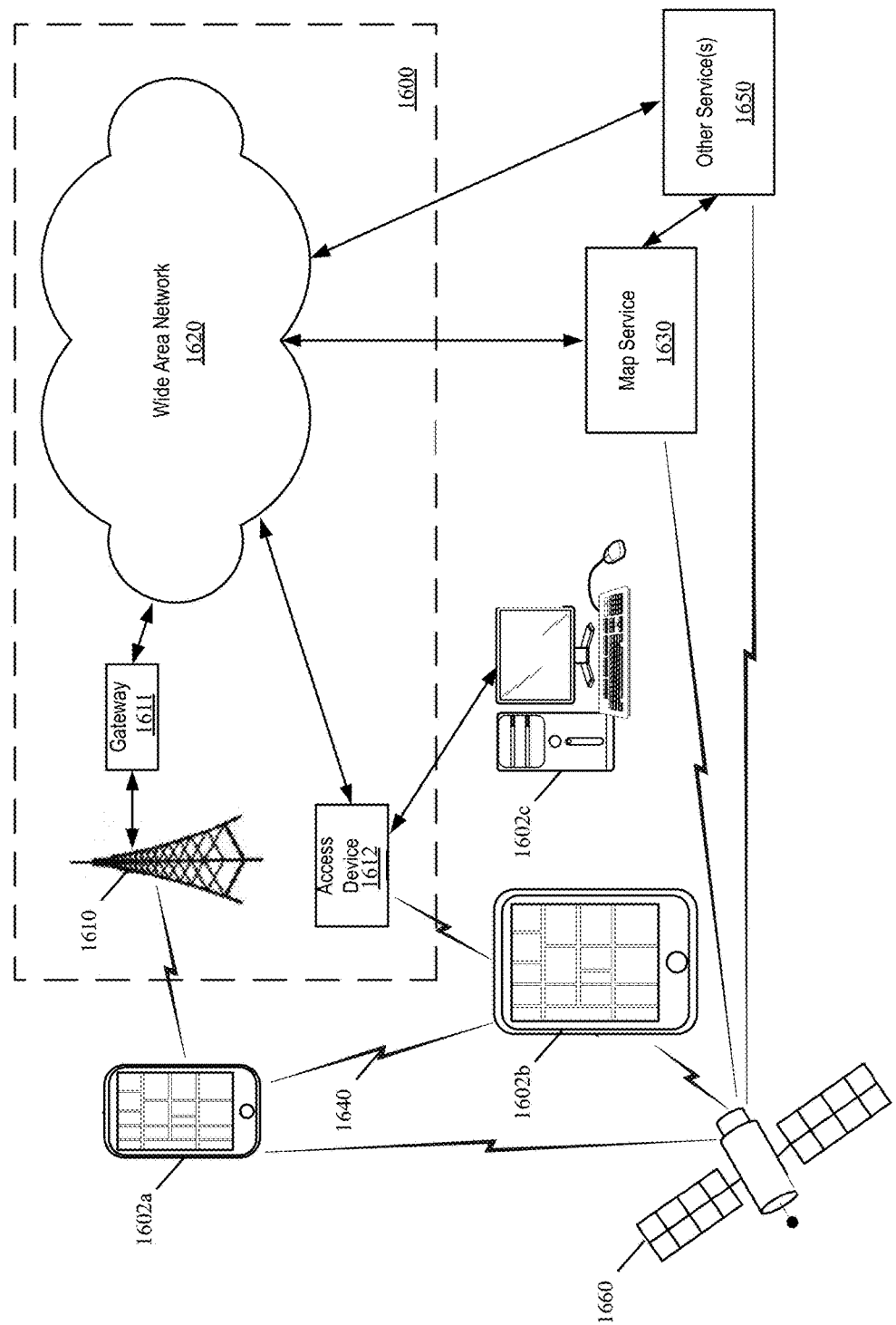
FIG. 16 illustrates one possible embodiment of an operating environment for a map service (also referred to as a mapping service) and client devices.

Various embodiments may operate within a map service operating environment. FIG. 16 illustrates one possible embodiment of an operating environment 1600 for a map service (also referred to as a mapping service) 1630 and client devices 1602a-1602c. In some embodiments, devices 1602a, 1602b, and 1602c communicate over one or more wired or wireless networks 1610. For example, wireless network 1610, such as a cellular network, can communicate with a wide area network (WAN) 1620, such as the Internet, by use of gateway 1614. A gateway 1614 in some embodiments provides a packet oriented mobile data service, such as General Packet Radio Service (GPRS), or other mobile data service allowing wireless networks to transmit data to other networks, such as wide area network 1620. Likewise, access device 1612 (e.g., IEEE 802.11g wireless access device) provides communication access to WAN 1620.

The client devices 1602a and 1602b can be any portable electronic or computing device capable of communicating with a map service (e.g., smart phone, tablet, laptop computer, etc.). Device 1602c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1602a-1602c are not shown as each accessing the map service 1630 via either the wireless network 1610 and gateway 1614 or the access device 1612, one of ordinary skill in the art will recognize that the client devices of some embodiments may access the map service via multiple different wired and/or wireless protocols.

Devices 1602a-1602c can also establish communications by other means. For example, these devices may communicate with other wireless devices (e.g., other devices 1602b, cell phones, etc.) over the wireless network 1610 or through access device 1612. Likewise the devices 1602a-1602c can establish peer-to-peer communications 1640 (e.g., a personal area network) by use of one or more communication subsystems, such as Bluetooth® communication or similar peer-to-peer protocols.

Devices 1602a-1602c may also receive Global Positioning Satellite (GPS) signals from GPS satellites 1660. In addition, in some embodiments the map service 1630 and other services 1650 may also receive GPS signals from GPS satellites 1660.

A map service 1630 may provide map services for one or more client devices 1602a-1602c in communication with the map service 1630 through various communication methods and protocols. A map service 1630 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1602a-1602c may utilize these map services to obtain the various map service data, then implement various techniques to process the data and provide the processed data to various entities (e.g., internal software or hardware modules, display screens of the client devices, external display screens, or other external systems or devices.

The map service 1630 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1602a-1602c, the map service 1630 of some embodiments, performs various optimization techniques to analyze a map tile before encoding the tile.

In some embodiments, the map tiles are generated by the map service 1630 for different possible display resolutions at the client devices 1602a-1602c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1630 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1630 responds to requests from the client devices 1602a-1602c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1602a-1602c that obtain map service data from the map service 1630 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1602a-1602c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1630. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1602a-1602c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1630 and/or other service(s) 1650 are configured to process search requests from any of the client devices. Search requests may include but are not limited to queries for businesses, addresses, residential locations, points of interest, or some combination thereof. Map service 1630 and/or other service(s) 1650 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1630 and/or other service(s) 1650 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1630 and/or other service(s) 1650, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1630 and/or other service(s) 1650 provide one or more feedback mechanisms to receive feedback from client devices 1602a-1602c. For instance, client devices may provide feedback on search results to map service 1630 and/or other service(s) 1650 (e.g., feedback specifying ratings, reviews, temporary or permanent business closures, errors etc.); this feedback may be used to update information about points of interest in order to provide more accurate or more up-to-date search results in the future. In some embodiments, map service 1630 and/or other service(s) 1650 may provide testing information to the client device (e.g., an A/B test) to determine which search results are best. For instance, at random intervals, the client device may receive and present two search results to a user and allow the user to indicate the best result. The client device may report the test results to map service 1630 and/or other service(s) 1650 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures. However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A non-transitory machine readable medium storing a map application executable by at least one processing unit of a device, the application comprising sets of instructions for:
   identifying a transit route between a starting location and a destination location, the transit route comprising a sequence of transit legs;
   presenting a first graphical user interface for the map application that includes a map display area and a route summary display area, where the map display area is separate from the route summary display area;
   presenting a map in the map display area, the map including a first graphical representation of the sequence of legs in the transit route;
   presenting a route summary of the transit route in the route summary display area, the route summary including a sequence of graphical representations indicating one or more transportation types for each of the transit legs, the sequence of graphical representations ordered according to the sequence of transit legs;
   in response to a request to start navigating the identified transit route, presenting a second graphical user interface for the map application that includes a first display area and a second display area;
   presenting in the first display area navigation instructions that describe a transit maneuver associated with a particular transit leg;
   presenting in the second display area a map region associated with the navigation instructions that are displayed in the first display area;
   presenting on the map region a second graphical representation of the particular transit leg, the second graphical representation including a first portion of the transit leg and a second portion of the transit leg; and
   presenting a first graphical element identifying a first transportation type for the first portion of the transit leg and a second graphical element identifying a second transportation type for the second portion of the transit leg, where the first transportation type is different than the second transportation type.

2. The non-transitory machine readable medium of claim 1, wherein each transit leg in the sequence of transit legs comprises one of a portion of the transit route that is traveled by a transit vehicle, and a navigable walking portion.

3. The non-transitory machine readable medium of claim 2, wherein a transit vehicle that travels a portion of the transit route comprises one of a subway train, a bus, a ferry, and a light rail train.

4. The non-transitory machine readable medium of claim 2, wherein a navigable walking portion comprises a navigable walking distance that is more than a threshold distance and between one of the starting location and a first transit station of the first transit leg, a last transit station of a transit leg and a first transit station of a subsequent transit leg, and a last transit station and the destination.

5. The non-transitory machine readable medium of claim 1, wherein the sequence of transit legs comprises at least two portions of the transit route that are traveled by two transit vehicles that are of a same type, wherein the two transit vehicles belong to two different transit lines.

6. The non-transitory machine readable medium of claim 1, wherein the device further comprises a touch sensitive display screen on which the first and second display areas are displayed, wherein the application further comprises sets of instructions for:
   receiving a touch and drag contact on the touch sensitive display screen, the touch and drag contact for scrolling through the set of navigation instructions on the first display area;
   upon receiving the touch and drag contact, determining in which direction the touch and drag contact on the first display area is dragged;
   when the touch and drag contact is dragged on the touch-sensitive display screen to the left, displaying (i) in the first display area, a next navigation instruction and (ii) in the second display area, a map region presentation associated with a portion of the transit route for which the next navigation instruction is displayed in the first display area; and
   when the touch and drag contact is dragged on the touch-sensitive display screen to the right, displaying (i) in the first display area, a previous navigation instruction and (ii) in the second display area, a map region presentation associated with a portion of the transit route for which the previous navigation instruction is displayed in the first display area.

7. The non-transitory machine readable medium of claim 1, wherein the application further comprises a set of instructions for identifying a current location of the device, wherein the second display area is further for displaying the current location of the device while stepping through the navigation instructions displayed in the first display area when the displayed portion of the map in the second display area includes the current location of the device.

8. The non-transitory machine readable medium of claim 1, wherein the application further comprises sets of instructions for:
   tracking a current location of the device;
   identifying a particular transit leg of the transit route that is associated with the current location of the device;
   determining that the currently displayed navigation instruction in the first display area does not describe a transit maneuver associated with the particular transit leg;
   automatically displaying:
      in the first display area, a navigation instruction that describes a transit maneuver associated with the particular transit leg; and
      in the second display area, a map region presentation that is associated with the navigation instruction.

9. The non-transitory machine readable medium of claim 8, wherein the set of instructions for automatically displaying comprises a set of instructions for automatically scrolling the navigation instructions and their associated map region presentations in the first and second display areas to reach the navigation instruction that describes a transit maneuver and the navigation instruction's associated map region presentation.

10. The non-transitory machine readable medium of claim 1, wherein each transit leg comprises a portion of the transit route that is traveled by a transit vehicle, the application further comprising sets of instructions for, before receiving the request to start navigating:
displaying a route summary comprising a selectable presentation of the sequence of transit legs; and
upon selection of the presentation, displaying a scrollable navigation list comprising every navigation instruction for the sequence of transit legs.

11. The non-transitory machine readable medium of claim 1, wherein the application further comprises sets of instructions for:
upon receiving the request to navigate to the destination, determining whether the current location of the device is within a threshold distance of the destination; and
when the current location of the device is within the threshold distance, switching from a transit navigation mode to a walking navigation mode in order to provide a set of turn-by-turn walking instructions to reach the destination.

12. For a map application executing on a device, a method for providing transit navigation presentation, the method comprising:
identifying a transit route between a starting location and a destination location, the transit route comprising a sequence of transit legs;
presenting a first graphical user interface for the map application that includes a map display area and a route summary display area, where the map display area is separate from the route summary display area;
presenting a map in the map display area, the map including a first graphical representation of the sequence of legs in the transit route;
presenting a route summary of the transit route in the route summary display area, the route summary including a sequence of graphical representations indicating one or more transportation types for each of the transit legs, the sequence of graphical representations ordered according to the sequence of transit legs;
in response to a request to start navigating the identified transit route presenting a second graphical user interface for the map application that includes a first display area and a second display area;
presenting in the first display area navigation instructions that describe a transit maneuver associated with a particular transit leg;
presenting in the second display area map region associated with the navigation instructions that are displayed in the first display area;
presenting on the map region a second graphical representation of the particular transit leg, the second graphical representation including a first portion of the transit leg and a second portion of the transit leg; and
presenting a first graphical element identifying a first transportation type for the first portion of the transit leg and a second graphical element identifying a second transportation type for the second portion of the transit leg, where the first transportation type is different than the second transportation type.

13. The method of claim 12 further comprising:
identifying a current location of the device; and
based on a distance between the current location of the device and a first transit station of a next transit leg, describing different transit maneuvers associated with the next transit leg.

14. The method of claim 13, wherein describing the different transit maneuvers comprises describing a first transit maneuver when the distance is more than a threshold distance, and describing a second different transit maneuver when the distance is less than or equal to the threshold distance.

15. The method of claim 12, wherein each transit leg comprises a portion of the transit route that is traveled by a transit vehicle, the method further comprising, for each current transit leg for which an associated navigation instruction is displayed in the first display area:
determining whether an alternative route comprising one or more alternative transit legs that can replace the current transit leg is available; and
when the alternative route is available, displaying, in the second display area, a selectable user interface (UI) item for replacing the current transit leg with the alternative route in order to modify the identified transit route.

16. The method of claim 15, wherein the alternative route comprises a transit route that (i) starts from or near a same transit station from which the current transit leg starts and (ii) ends at or near a same transit station at which the current transit leg ends.

17. The method of claim 15 further comprising, upon selection of the UI item, replacing the current transit leg with the one or more alternative transit legs of the alternative route.

18. An electronic device comprising:
a set of processing units for executing sets of instructions; and
a non-transitory machine readable medium storing a map application which when executed by at least one of the processing units of the device provides a transit navigation presentation, the application comprising sets of instructions for:
identifying a transit route between a starting location and a destination location, the transit route comprising a sequence of transit legs;
presenting a first graphical user interface for the map application that includes a map display area and a route summary display area, where the map display area is separate from the route summary display area;
presenting a map in the map display area, the map including a first graphical representation of the sequence of legs in the transit route;
presenting a route summary of the transit route in the route summary display area, the route summary including a sequence of graphical representations indicating one or more transportation types for each of the transit legs, the sequence of graphical representations ordered according to the sequence of transit legs;
in response to a request to start navigating the identified transit route, presenting a second graphical user interface for the map application that includes a first display area and a second display area;
presenting in the first display area navigation instructions that describe a transit maneuver associated with a particular transit leg;
presenting in the second display area a map region associated with the navigation instructions that are displayed in the first display area;

presenting on the map region a second graphical representation of the particular transit leg, the second graphical representation including a first portion of the transit leg and a second portion of the transit leg; and presenting a first graphical element identifying a first transportation type for the first portion of the transit leg and a second graphical element identifying a second transportation type for the second portion of the transit leg, where the first transportation type is different than the second transportation type.

19. The electronic device of claim 18, wherein the transit maneuver further comprises a departure schedule of the transit line at the first transit station.

20. The electronic device of claim 19, wherein the departure schedule for the transit line comprises a frequency of departures of transit vehicles of the transit line at the first transit station.

21. The electronic device of claim 20, wherein the frequency of departures of the transit vehicles of the transit line at the first transit station comprises a time interval between each pair of departures of the transit vehicles of the transit line from the first transit station.

22. The electronic device of claim 19, wherein the departure schedule for the transit line comprises (i) a frequency of departures of transit vehicles of the transit line at the first transit station when the transit line is a high frequency transit line, and (ii) a set of departure times of a set of next transit vehicles of the transit line from the first transit station when the transit line is a low frequency transit line.

23. The electronic device of claim 18, wherein the last transit station comprises a subway station, wherein a subsequent transit maneuver comprises an exit location through which to exit the subway station.

\* \* \* \* \*